US012568546B2

(12) United States Patent (10) Patent No.: US 12,568,546 B2

Jung (45) Date of Patent: Mar. 3, 2026

(54) METHOD AND APPARATUS FOR LOGGING CONNECTION ESTABLISHMENT FAILURE INFORMATION IN A WIRELESS COMMUNICATION SYSTEM

(71) Applicant: Samsung Electronics Co., Ltd., Suwon-si (KR)

(72) Inventor: Sangyeob Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 292 days.

(21) Appl. No.: 18/193,479

(22) Filed: Mar. 30, 2023

(65) Prior Publication Data

US 2023/0319933 A1 Oct. 5, 2023

(30) Foreign Application Priority Data

Mar. 31, 2022 (KR) ........................ 10-2022-0040580

(51) Int. Cl.
H04W 76/18 (2018.01)
H04W 84/04 (2009.01)

(52) U.S. Cl.
CPC .......... H04W 76/18 (2018.02); *H04W 84/042* (2013.01)

(58) Field of Classification Search
CPC ..... H04W 76/18; H04W 24/10; H04W 76/19; H04W 74/0833; H04W 84/042
See application file for complete search history.

(56) References Cited

U.S. PATENT DOCUMENTS 11,696,356 B2 * 7/2023 Kim ................... H04W 74/0833
455/456.1
2014/0128057 A1 * 5/2014 Siomina ................ H04W 56/00
455/423

(Continued)

FOREIGN PATENT DOCUMENTS

CA 2850299 A1 * 4/2013 ............ H04W 24/02
CN 113498104 A * 10/2021 ............ H04W 76/19

(Continued)

OTHER PUBLICATIONS

International Search Report and Written Opinion of the International Searching Authority dated Jun. 30, 2023, in connection with International Application No. PCT/KR2023/004259, 6 pages.
3GPP TS 38.331 V16.7.0 (Dec. 2021), Technical Specification, 3rd Generation Partnership Project; Technical Specification Group Radio Access Network; NR; Radio Resource Control (RRC) protocol specification (Release 16), Dec. 2021, 963 pages.

(Continued)

*Primary Examiner* — Dung Hong

(57) ABSTRACT

The disclosure relates to a 5G or 6G communication system for supporting a higher data transmission rate. A method of a UE in a wireless communication system is provided. The method includes initiating a connection establishment procedure or a connection resume procedure on a cell and starting a timer corresponding to the connection establishment procedure or the connection resume procedure, identifying that the timer expires, in case that a cell identity of the cell is not equal to a cell identity stored in a UE variable for a connection failure report, storing first connection failure report information stored in the UE variable in a new entry of a list of UE variables for multiple connection failure reports, clearing the UE variable and storing second connection failure report information for the cell in the UE variable, and transmitting a message including the UE variable and the list of UE variables.

20 Claims, 12 Drawing Sheets

(56)　　　References Cited

U.S. PATENT DOCUMENTS

| | | | | |
|---|---|---|---|---|
| 2016/0165473 A1* | 6/2016 | Lin | .................. | H04W 76/18 |
| | | | | 370/252 |
| 2020/0120740 A1 | 4/2020 | Kim et al. | | |
| 2021/0219375 A1 | 7/2021 | Kim et al. | | |
| 2022/0078875 A1* | 3/2022 | Ou | .................. | H04W 74/0833 |
| 2022/0295318 A1 | 9/2022 | Hwang et al. | | |
| 2023/0171655 A1* | 6/2023 | Chen | .................. | H04W 36/00 |
| | | | | 370/331 |
| 2023/0171825 A1* | 6/2023 | Kuo | .................. | H04W 76/19 |
| | | | | 370/315 |
| 2023/0319934 A1* | 10/2023 | Geng | .................. | H04W 76/18 |
| | | | | 370/328 |

FOREIGN PATENT DOCUMENTS

| | | | | | |
|---|---|---|---|---|---|
| KR | 10-2021-0125865 A | 10/2021 | | | |
| WO | WO-2015017975 A1 * | 2/2015 | ........... | H04W 76/18 |
| WO | 2020197259 A1 | 10/2020 | | | |
| WO | 2020197458 A1 | 10/2020 | | | |
| WO | 2021029686 A1 | 2/2021 | | | |

OTHER PUBLICATIONS

3GPP TS 36.304 V16.6.0 (Dec. 2021) Technical Specification, 3rd Generation Partnership Project; Technical Specification Group Radio Access Network; Evolved Universal Terrestrial Radio Access (E-UTRA); User Equipment (UE) procedures in idle mode (Release 16), Dec. 2021, 64 pages.
3GPP TS 38.304 V16.7.0 (Dec. 2021) Technical Specification, 3rd Generation Partnership Project; Technical Specification Group Radio Access Network; NR; User Equipment (UE) procedures in Idle mode and RRC Inactive state (Release 16), Dec. 2021, 39 pages.
Supplementary European Search Report dated Aug. 13, 2025, in connection with European Application No. 23781389.4, 7 pages.
Ericsson, "On logged MDT related enhancements," R2-2200889, 3GPP TSG-RAN WG2 Meeting #116bis-e, Online meeting, Jan. 17-25, 2022, 16 pages.
Huawei (email rapporteur), "Pre-meeting discussion report for R17 MDT," R2-2203026, 3GPP TSG-RAN WG2 #117, eMeeting, Feb. 21-Mar. 3, 2022, 9 pages.
Samsung, "[S716] Remaining issues on multiple CEF reports," R2-2205736, 3GPP TSG-RAN WG2 Meeting #118-e, Online, May 9-20, 2022, 7 pages.

* cited by examiner

RF processor 11-20

Baseband processor 11-40

Controller 11-42

Multi-link processor 11-30

Storage

FIG. 12

METHOD AND APPARATUS FOR LOGGING CONNECTION ESTABLISHMENT FAILURE INFORMATION IN A WIRELESS COMMUNICATION SYSTEM

CROSS-REFERENCE TO RELATED APPLICATION(S)

This application is based on and claims priority under 35 U.S.C. § 119 to Korean Patent Application No. 10-2022-0040580, filed on Mar. 31, 2022, in the Korean Intellectual Property Office, the disclosure of which is herein incorporated by reference in its entirety.

BACKGROUND

1. Field

The present disclosure relates to a wireless communication system. More specifically, the present disclosure relates to a method and apparatus for logging connection establishment failure information in a wireless communication system.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broad-bands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

With the development of wireless communication systems, there is a need for a method and apparatus for efficiently logging and reporting radio resource control (RRC) connection establishment or resume failure information by a UE in an NR system.

In an embodiment, a method of a user equipment (UE) in a wireless communication system is provided. The method includes initiating a connection establishment procedure or a connection resume procedure on a cell and starting a timer corresponding to the connection establishment procedure or the connection resume procedure, identifying that the timer expires, in case that a cell identity of the cell is not equal to a cell identity stored in a UE variable for a connection failure report, storing first connection failure report information that was stored in the UE variable in a new entry of a list of UE variables for multiple connection failure reports, clearing the UE variable and storing second connection failure report information for the cell in the UE variable, and transmitting a message including the UE variable and the list of UE variables.

In an embodiment, a UE in a wireless communication system is provided. The UE includes a transceiver and a controller operably coupled to the transceiver. The controller is configured to initiate a connection establishment procedure or a connection resume procedure on a cell and start a timer corresponding to the connection establishment procedure or the connection resume procedure, identify that the timer expires, in case that a cell identity of the cell is not equal to a cell identity stored in a UE variable for a connection failure report, store first connection failure report information that was stored in the UE variable in a new entry of a list of UE variables for multiple connection failure reports, clear the UE variable and store second connection failure report information for the cell in the UE variable, and transmit, via the transceiver, a message including the UE variable and the list of UE variables.

According to an embodiment of the disclosure, in an NR system, a UE may efficiently store and report RRC connection establishment or resume failure information to an NR cell.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 11 illustrates an internal structure of a UE according to an embodiment of the present disclosure; and FIG. 12 illustrates a configuration of an NR base station according to an embodiment of the present disclosure.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description of the disclosure, a detailed description of known functions or configurations incorporated herein will be omitted when it is determined that the description may make the subject matter of the disclosure unnecessarily unclear. Hereinafter, embodiments of the disclosure will be described in detail with reference to the accompanying drawings.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards for the convenience of description. However, the disclosure is not limited by these terms and names, and may be applied in the same way to systems that conform other standards. In the disclosure, the term "eNB" may be interchangeably used with the term "gNB." That is, a base station described as "eNB" may indicate "gNB."

Figure 1:
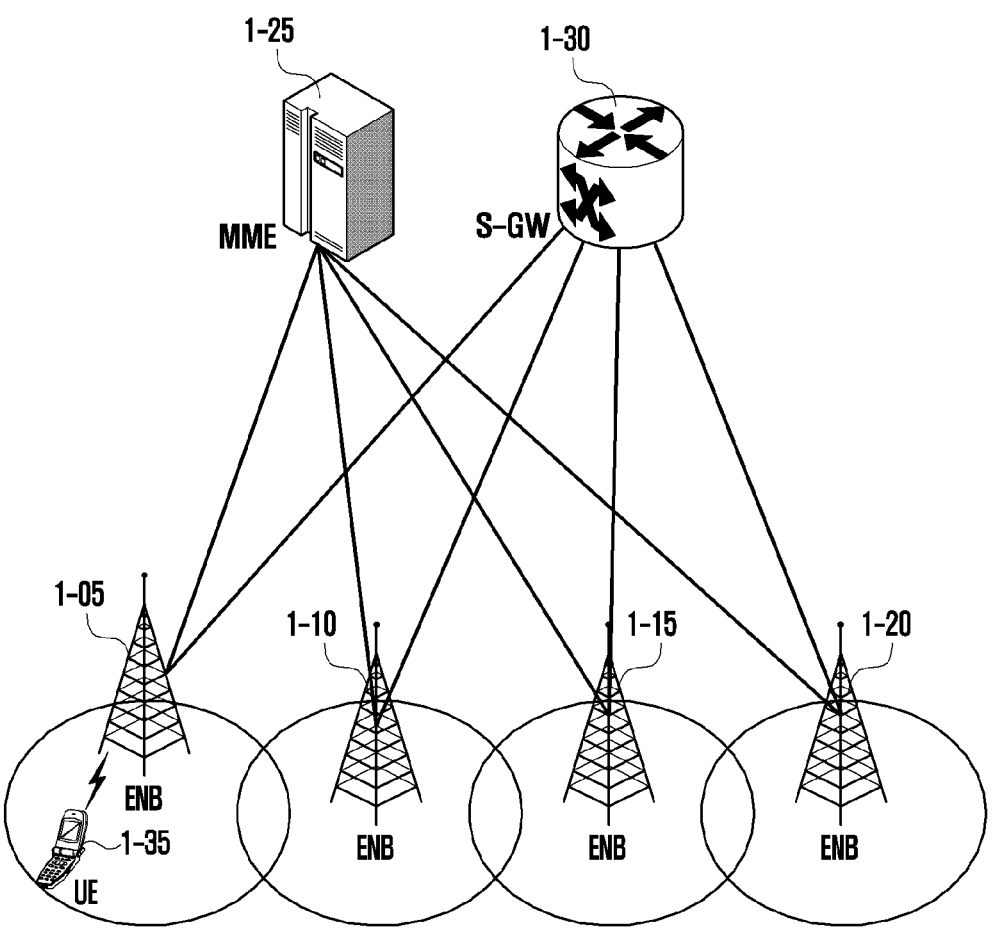
FIG. 1 illustrates the structure of an LTE system according to an embodiment of the present disclosure.

FIG. 1 illustrates a structure of an LTE system according to an embodiment of the present disclosure.

Referring to FIG. 1, as illustrated, a radio access network of the LTE system consists of a next-generation base station (evolved Node B, hereinafter, ENB, Node B or base station) 1-05, 1-10, 1-15, and 1-20, a mobility management entity (MME) 1-25, and a serving-gateway (S-GW) 1-30. A user equipment (hereinafter, UE or terminal) 1-35 accesses an external network through the ENBs 1-05 to 1-20 and the S-GW 1-30.

In FIG. 1, the ENBs 1-05 to 1-20 corresponds to the existing Node B of a UMTS system. The ENBs are connected to the UE 1-35 through a radio channel and performs a more complex role than the existing Node B. In the LTE system, because all user traffic, including real-time services such as voice over IP (VoIP) through Internet protocol, may be serviced through shared channels, a device for scheduling by collecting state information such as a buffer state of the UEs, an available transmission power state, a channel state, etc. is required, and the ENBs 1-05 to 1-20 are responsible for this. One ENB typically controls multiple cells. For example, in order to implement a transmission rate of 100 Mbps, the LTE system uses, for example, orthogonal frequency division multiplexing (hereinafter, referred to as OFDM) in a 20 MHz bandwidth as a radio access technology. In addition, an adaptive modulation & coding (hereinafter, referred to as AMC) scheme determining a modulation scheme and a channel coding rate based on the channel state of the UE is applied. The S-GW 1-30 is a device that provides a data bearer, and generates or removes the data bearer under the control of the MME 1-25. The MME is a device in charge of various control functions as well as a mobility management function for the UE, and connected to a plurality of base stations.

Figure 2:
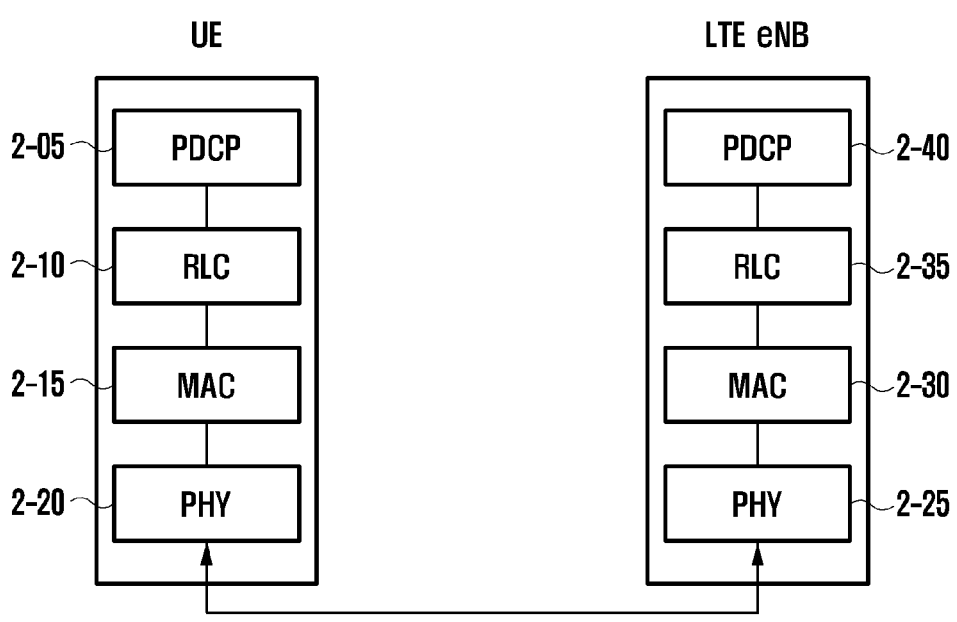
FIG. 2 illustrates a radio protocol structure in an LTE system according to an embodiment of the present disclosure.

FIG. 2 illustrates a radio protocol structure in an LTE system according to an embodiment of the present disclosure.

Referring to FIG. 2, the radio protocol of the LTE system consists of a packet data convergence protocol (PDCP) 2-05 and 2-40, a radio link control (RLC) 2-10 and 2-35, and a medium access control (MAC) 2-15 and 2-30 in the UE and ENB, respectively. The packet data convergence protocol (PDCP) 2-05 and 2-40 is responsible for operations of IP header compression/decompression, etc. Main functions of PDCP is summarized as follows:

Header compression and decompression (ROHC only);
Transfer of user data;
In-sequence delivery of upper layer PDUs at PDCP re-establishment procedure for RLC AM;
For split bearers in DC (only support for RLC AM): PDCP PDU routing for transmission and PDCP PDU reordering for reception;
Duplicate detection of lower layer SDUs at PDCP re-establishment procedure for RLC AM;
Retransmission of PDCP SDUs at handover and, for split bearers in DC, of PDCP PDUs at PDCP data-recovery procedure, for RLC AM;
Ciphering and deciphering; and
Timer-based SDU discard in uplink.

The radio link control (hereinafter, referred to as RLC) 2-10 and 2-35 performs ARQ operation by reconfiguring a PDCP packet data unit (PDU) to an appropriate size. Main functions of the RLC are summarized below:

Transfer of upper layer PDUs;
Error Correction through ARQ (only for AM data transfer);
Concatenation, segmentation and reassembly of RLC SDUs (only for UM and AM data transfer);
Re-segmentation of RLC data PDUs (only for AM data transfer);
Reordering of RLC data PDUs (only for UM and AM data transfer);
Duplicate detection (only for UM and AM data transfer);
Protocol error detection (only for AM data transfer);
RLC SDU discard (only for UM and AM data transfer); and
RLC re-establishment.

The MACs 2-15 and 2-30 are connected to several RLC layers configured in one UE, and perform operations of multiplexing RLC PDUs into MAC PDUs and demultiplexing RLC PDUs from MAC PDUs. Main functions of the MAC are summarized as follows:

Mapping between logical channels and transport channels;
Multiplexing/demultiplexing of MAC SDUs belonging to one or different logical channels into/from transport blocks (TB) delivered to/from the physical layer on transport channels;
Scheduling information reporting;
Error correction through HARQ;
Priority handling between logical channels of one UE;
Priority handling between UEs by means of dynamic scheduling;

MBMS service identification;

Transport format selection; and

Padding.

The physical layers 2-20 and 2-25 channel-code and modulate upper layer data, make OFDM symbols and transmits the OFDM symbols through a radio channel, or demodulate and channel-decode the OFDM symbols received through the radio channel and transmits them to upper layers.

Figure 3:
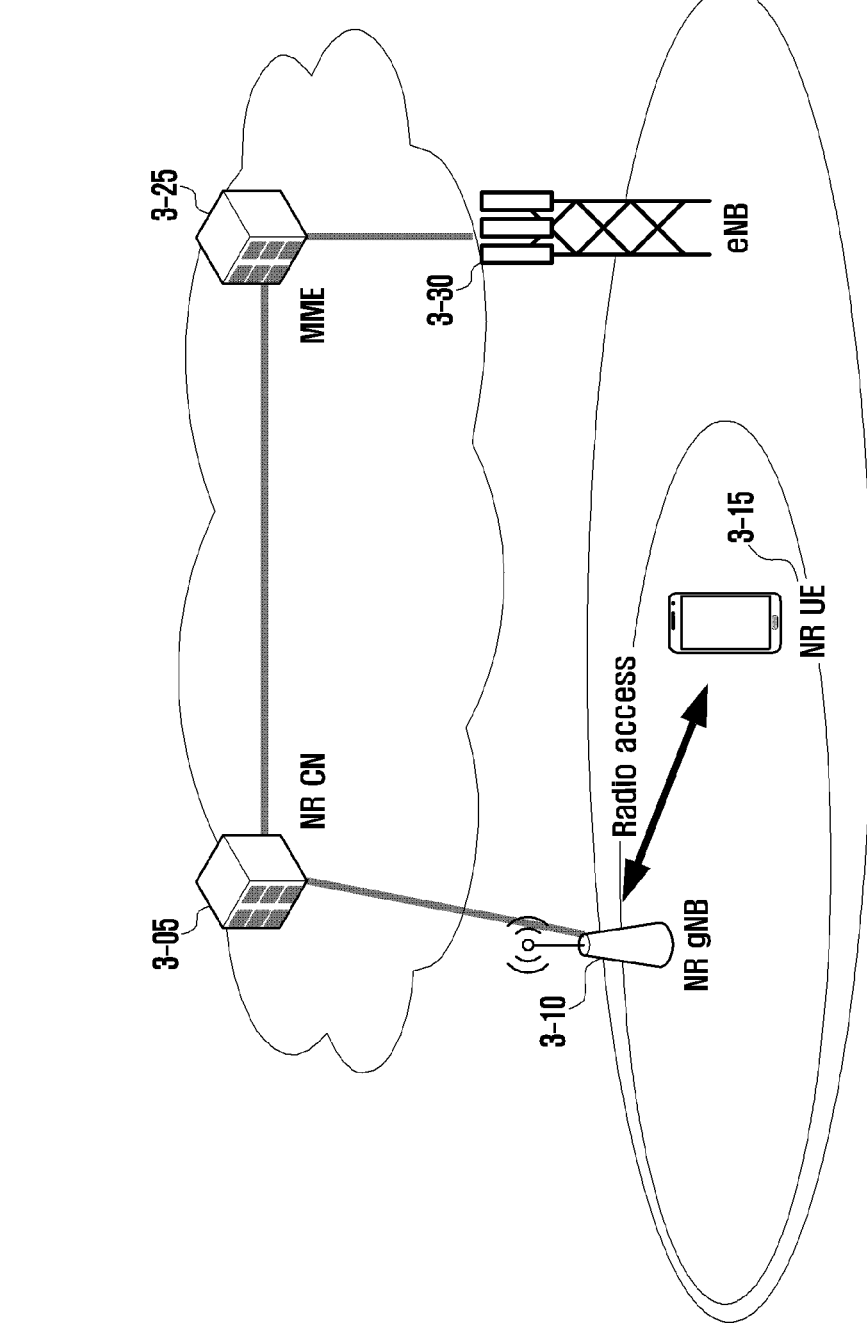
FIG. 3 illustrates a structure of a next-generation mobile communication system according to an embodiment of the present disclosure.

FIG. 3 illustrates a structure of a next-generation mobile communication system according to an embodiment of the present disclosure.

Referring to FIG. 3, as illustrated, a radio access network of the next-generation mobile communication system (hereinafter, NR or 5G) is composed of a next-generation base station (new radio node B, hereinafter, NR gNB or NR base station) 3-10 and a new radio core network (NR CN) 3-05. A new radio user equipment (hereinafter, NR UE or terminal) 3-15 accesses an external network through an NR gNB 3-10 and an NR CN 3-05.

In FIG. 3, the NR gNB 3-10 corresponds to an evolved Node B (eNB) of the existing LTE system. The NR gNB is connected to the NR UE 3-15 through a radio channel and may provide a service superior to that of the existing Node B. In the next-generation mobile communication system because all user traffic is serviced through the shared channel, a device for scheduling by collecting state information such as a buffer state of the UEs, an available transmission power state, a channel state, etc. is required, and the NR NB 3-10 is responsible for this. One NR gNB usually controls multiple cells. A bandwidth greater than or equal to the existing maximum bandwidth may be applied in order to implement ultra-high-speed data transmission compared to current LTE, and additional beamforming technology may be grafted by using orthogonal frequency division multiplexing (hereinafter, referred to as OFDM) as a radio access technology.

In addition, an adaptive modulation & coding (hereinafter, referred to as AMC) scheme for determining a modulation scheme and a channel coding rate according to the channel state of the UE is applied. The NR CN 3-05 performs functions such as mobility support, bearer configuration, QoS configuration, and the like. The NR CN is a device in charge of various control functions as well as a mobility management function for the UE, and is connected to a plurality of base stations. In addition, the next-generation mobile communication system may be linked with the existing LTE system, and the NR CN is connected to the MME 3-25 through a network interface. The MME is connected to the existing base station eNB 3-30.

Figure 4:
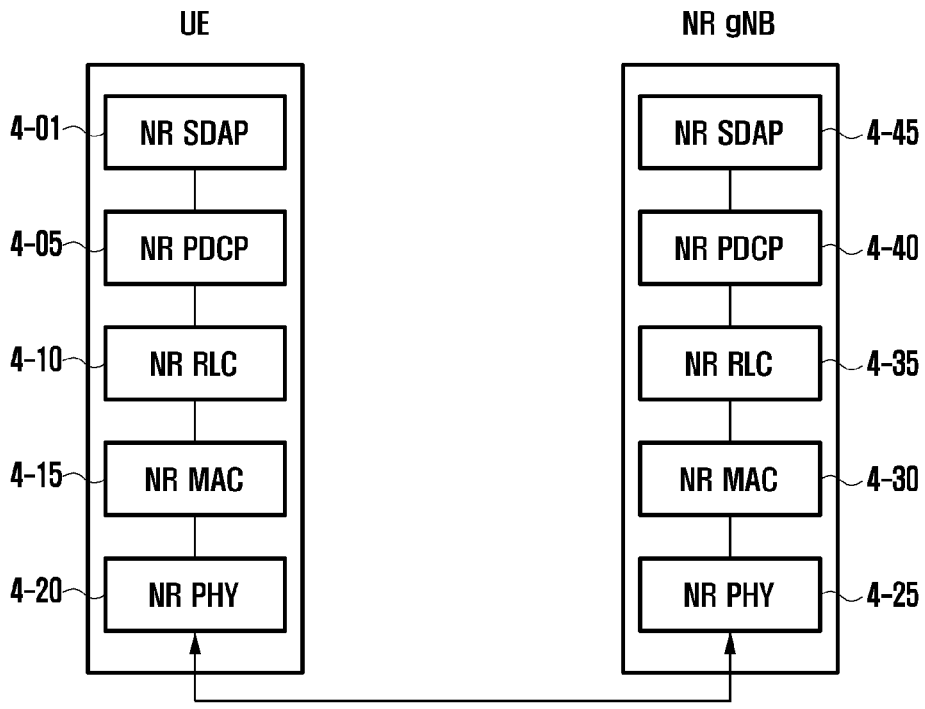
FIG. 4 illustrates a radio protocol structure of a next-generation mobile communication system according to an embodiment of the present disclosure.

FIG. 4 illustrates a radio protocol structure of a next-generation mobile communication system according to an embodiment of the present disclosure.

Referring to FIG. 4, a radio protocol of the next-generation mobile communication system consists of an NR SDAP 4-01 and 4-45, NR PDCP 4-05 and 4-40, NR RLC 4-10 and 4-35, and NR MAC 4-15 and 4-30 in a UE and an NR base station, respectively.

Main functions of the NR SDAPs 4-01 and 4-45 may include some of the following functions:

Transfer of user plane data;

Mapping between a QoS flow and a DRB for both DL and UL;

Marking QoS flow ID in both DL and UL packets; and

Reflective QoS flow to DRB mapping for the UL SDAP PDUs.

With respect to the SDAP layer, the UE may be configured with an RRC message whether to use a SDAP layer header or the function of the SDAP layer for each PDCP layer, for each bearer, or for each logical channel, and in a case where the SDAP header is configured, the UE may instruct the UE to update or reconfigure mapping information for uplink and downlink QoS flows and data bearers with a non-access stratum (NAS) quality of service (QoS) reflected configuration 1-bit indicator (NAS reflective QoS) and an AS QoS reflected configuration 1-bit indicator (AS reflective QoS) of the SDAP header. The SDAP header may include QoS flow ID information indicating QoS. The QoS information may be used as data processing priority, scheduling information, etc. to support a smooth service.

Main function of the NR PDCP 4-05 and 4-40 may include some of the following functions:

Header compression and decompression (ROHC only);

Transfer of user data;

In-sequence delivery of upper layer PDUs;

Out-of-sequence delivery of upper layer PDUs;

PDCP PDU reordering for reception;

Duplicate detection of lower layer SDUs;

Retransmission of PDCP SDUs;

Ciphering and deciphering; and

Timer-based SDU discard in uplink.

In the above description, the reordering function of the NR PDCP may refer to a function of reordering PDCP PDUs received from a lower layer in order based on a PDCP sequence number (SN), and may include a function to transmit data to the upper layer in the rearranged order or a function to directly transmit data without considering the order, a function to record lost PDCP PDUs by rearranging the order, a function to report the state of lost PDCP PDUs to the transmitting side, and a function to request retransmission for lost PDCP PDUs.

The main function of the NR RLC 4-10 and 4-35 may include some of the following functions:

Transfer of upper layer PDUs;

In-sequence delivery of upper layer PDUs;

Out-of-sequence delivery of upper layer PDUs;

Error Correction through ARQ;

Concatenation, segmentation and reassembly of RLC SDUs;

Re-segmentation of RLC data PDUs;

Reordering of RLC data PDUs;

Duplicate detection;

Protocol error detection;

RLC SDU discard; and

RLC re-establishment.

In the above description, the in-sequence delivery of the NR RLC refers to a function of sequentially delivering RLC SDUs received from a lower layer to an upper layer, may include a function to reassemble and deliver divided RLC SDUs in a case where originally one RLC SDU is divided into several RLC SDUs and received, may include a function to rearrange received RLC PDUs based on RLC sequence number (SN) or PDCP sequence number (SN), a function to reorder and record lost RLC PDUs, a function to report the state of lost RLC PDUs to the transmitting side, a function to request retransmission of lost RLC PDUs, a function of sequentially delivering only the RLC SDUs before the lost RLC SDU to the upper layer when there is a missing RLC SDU, or may include a function of sequentially delivering all RLC SDUs received before the timer starts to the upper layer if a predetermined timer has expired even if there is a lost RLC SDU, or may include a function of sequentially delivering all RLC SDUs received before the timer starts to the upper layer if a predetermined timer has expired even if there is a lost RLC SDU, or may include a function of sequentially delivering all RLC SDUs received so far to the upper layer if a predetermined timer has expired even if there is a lost RLC SDU.

In addition, in the above, RLC PDUs may be processed in the order they are received (regardless of the order of serial numbers and sequence numbers, in the order of arrival) and delivered to the PDCP device out of order (out-of-sequence delivery), and in the case of segments, segments stored in the buffer or to be received later are received, reconstructed into one complete RLC PDU, processed, and transmitted to the PDCP device. The NR RLC layer may not include a concatenation function, and the function may be performed by the NR MAC layer or replaced with a multiplexing function of the NR MAC layer.

In the above description, the out-of-sequence delivery of the NR RLC device refers to a function of directly delivering RLC SDUs received from a lower layer to an upper layer regardless of order, and may include a function of reassembling and delivering in a case where originally one RLC SDU is divided into several RLC SDUs and received, and a function of storing the RLC SN or PDCP SN of the received RLC PDUs, arranging the order, and recording the lost RLC PDUs.

The NR MACs 4-15 and 4-30 may be connected to several NR RLC layers configured in one UE, and the main function of the NR MAC may include some of the following functions:

Mapping between logical channels and transport channels;

Multiplexing/demultiplexing of MAC SDUs;

Scheduling information reporting;

Error correction through HARQ;

Priority handling between logical channels of one UE;

Priority handling between UEs by means of dynamic scheduling;

MBMS service identification;

Transport format selection; and

Padding.

The NR PHY layer 4-20 and 4-25 may channel-code and modulate upper layer data, make OFDM symbols and transmits the OFDM symbols through a radio channel, or may demodulate and channel-decode the OFDM symbols received through the radio channel and transmits them to upper layers.

Figure 5:
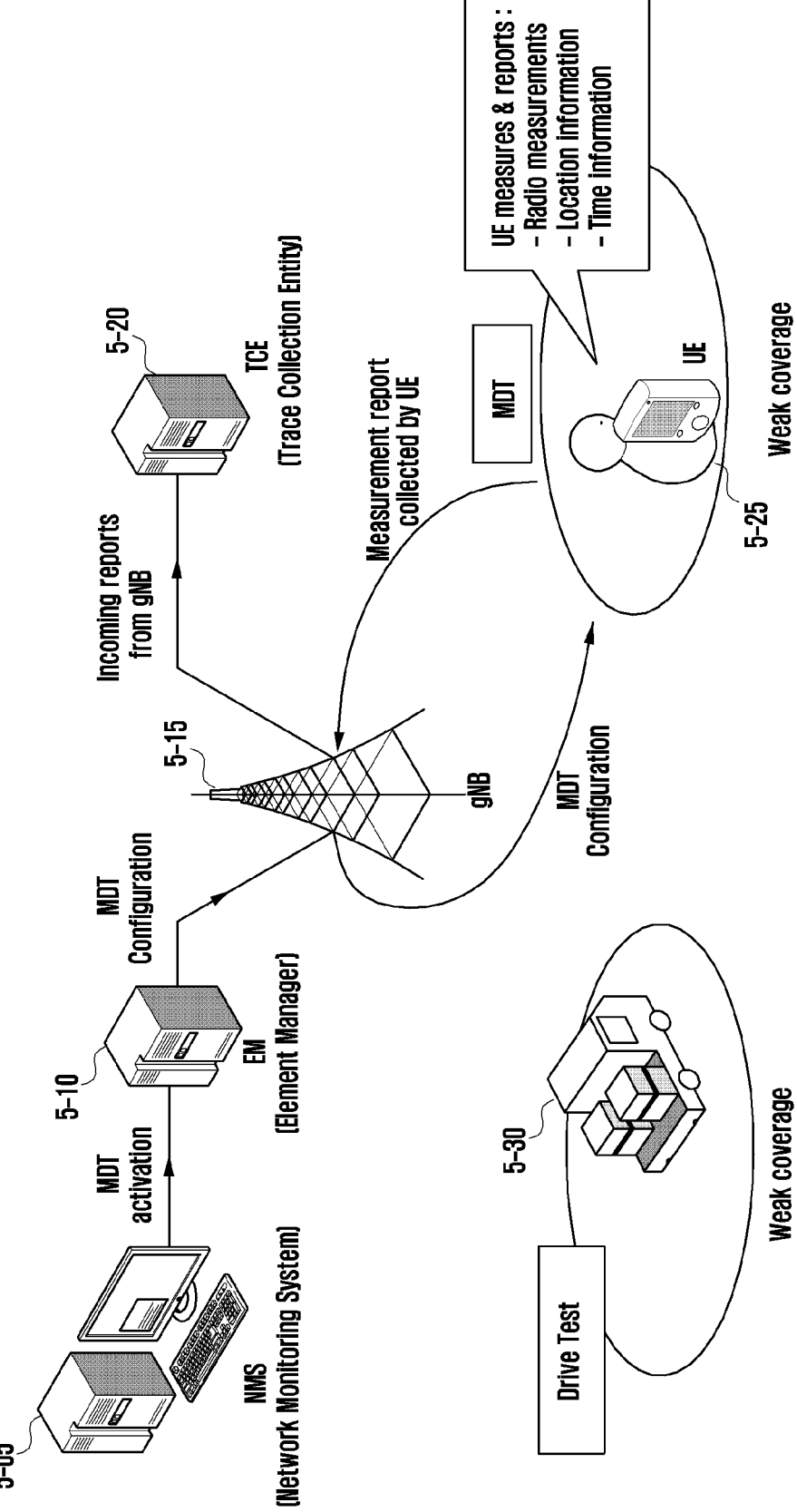
FIG. 5 illustrates a technique for collecting and reporting cell measurement information according to an embodiment of the present disclosure.

FIG. 5 illustrates a technique for collecting and reporting cell measurement information according to an embodiment of the present disclosure.

When establishing or optimizing a network, a mobile communication operator usually measures the signal strength in an expected service area and, based on this, places or readjusts base stations in the service area. The operator loads signal measurement equipment on a vehicle and collects cell measurement information in the service area, which requires a lot of time and cost. The process is generally referred to as the drive test using a vehicle. The UE is equipped with a function capable of measuring a signal to the base station in order to support operations such as cell reselection or handover, and addition of serving cells when moving between cells. Therefore, instead of the drive test, a UE in the service area may be used, which is referred to as the minimization of drive test (MDT). The operator may configure MDT operations to specific UEs through various configuration devices in the network, and the UEs collect and store signal strength information from serving cells and peripheral cells in an RRC connected mode (RRC_CON- NECTED), an RRC idle mode (RRC_IDLE) or an RRC inactive mode (RRC INACTIVE). In addition, the UEs also store a variety of information such as location information, time information, and signal quality information. The stored information may be reported to the network when the UEs are in the connected mode, and the information is transmitted to a specific server.

The MDT operation is largely classified into an immediate MDT and a logged MDT.

The immediate MDT is characterized by immediately reporting the collected information to the network. Since the report should be made immediately, only the RRC connected mode UE may perform this. In general, an RRM measurement process for supporting operations such as handover and addition of a serving cell is reused, and location information, time information, etc. are additionally reported.

The logged MDT is characterized by storing the collected information without immediately reporting the information to the network, and then reporting the stored information after the UE switches to the RRC connected mode. In general, a UE in the RRC idle mode or the RRC inactive mode, which cannot immediately report to the network performs this. In the disclosure, a UE in the RRC inactive mode introduced in a next-generation mobile communication system is characterized by performing the logged MDT. When a specific UE is in the RRC connected mode, the network provides the UE with configuration information for performing the logged MDT operation, and the UE collects and stores the configuration information after switching to the RRC idle mode or the RRC inactive mode.

The relationship between the type of the MDT operation and the RRC state of the UE is summarized in Table 1 below.

TABLE 1

| | RRC state |
| --- | --- |
| Immediate MDT | RRC_CONNECTED |
| Logged MDT | RRC_IDLE, RRC_INACTIVE |

Figure 6:
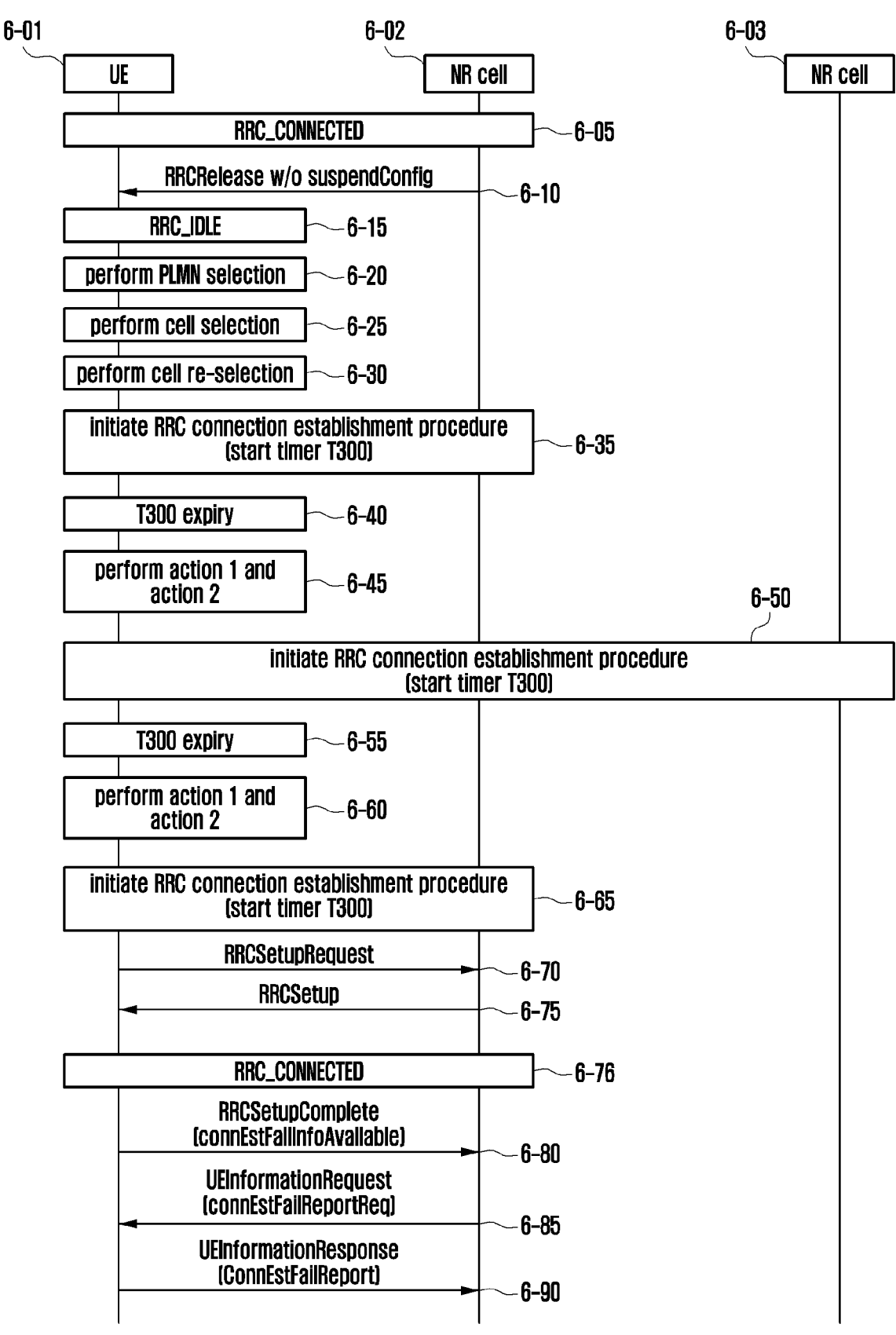
FIG. 6 illustrates a flowchart of a process in which a UE stores and reports single RRC connection establishment/resume failure information to an NR cell in an NR system according to an embodiment of the present disclosure.

FIG. 6 illustrates a process in which a UE stores and reports single RRC connection establishment/resume failure information to an NR cell in an NR system according to an embodiment of the present disclosure.

In FIG. 6, not all of the steps described below must be included according to configurations and/or definitions on the system, and some steps may be omitted.

A UE according to an embodiment of the disclosure may store single RRC connection establishment/resume failure information (single connection establishment/resume failure information, hereinafter single CEF) in a UE variable (e.g., VarConnEstFailReport) including connection establishment failure and/or connection resume failure information and transmit the same to an NR cell (or base station, or gNB, hereinafter used interchangeably). For example, the UE may store only RRC connection establishment/resume failure information for a cell that has most recently failed to establish/resume the RRC connection and transmit the same to the NR cell. In an example, since the UE mandatorily supports the single CEF function, the NR cell may not be notified whether the single CEF function is supported.

Referring to FIG. 6, in step 6-05, a UE 6-01 may be in an RRC connected mode (RRC_CONNECTED) by establishing an RRC connection with an NR cell 6-02.

In step 6-10, the NR cell 6-02 may transmit an RRC connection release message (RRCRelease) not including suspend configuration information (suspendConfig) to the UE 6-01.

In step 6-15, the UE 6-01 receiving the RRCRelease message may transition to the RRC idle mode (RRC_IDLE).

In step 6-20, the UE 6-01 in the RRC idle mode may perform a public land mobile network (PLMN) selection process. In the UE, the AS may report available PLMNs to the NAS on request from the NAS or automatically. The UE may scan all RF channels in the NR bands according to the UE's capabilities to find available PLMNs. On each carrier, the UE may search for the strongest cell and read the UE's system information, in order to find out which PLMN(s) the cell belongs to. If the UE can read one or several PLMN identities in the strongest cell, each found PLMN may be reported to the NAS as a high quality PLMN (but without the RSRP value), provided that the following high-quality criterion is fulfilled.

High-quality criterion: For an NR cell, the measured RSRP value may be greater than or equal to −110 dBm.

Found PLMNs that do not satisfy the high-quality criterion but for which the UE has been able to read the PLMN identities are reported to the NAS together with their corresponding RSRP values. The quality measure reported by the UE to NAS may be the same for each PLMN found in one cell. The search for PLMNs may be stopped on request from the NAS. The UE use the stored information (refers to, for example, information on cell parameters that may be obtained from frequencies and previously selectively received measurement control information elements) to optimize the PLMN selection process. For reference, when the UE 6-01 in the RRC idle mode registers the selected PLMN (this PLMN may be referred to as registered PLMN, hereinafter referred to as RPLMN) before the step 6-20 and does not deviate from the corresponding registration area, the UE may not perform the step 6-20.

In step 6-25, the UE 6-01 in the RRC idle mode may perform a cell selection process to camp-on a suitable cell for the selected or registered PLMN.

In step 6-30, the UE 6-01 in the RRC idle mode may perform a cell re-selection process to find a better suitable cell.

In step 6-35, the UE 6-01 in the RRC idle mode may initiate an RRC connection establishment procedure with the NR cell 6-02. Upon initiation of the RRC connection establishment procedure, the UE may start a T300 timer.

In step 6-40, the T300 timer driven by the UE in step 6-35 may expire.

In step 6-45, the UE may sequentially perform operations 1 and 2.

Operation 1: Operation Unrelated to VarConnEstFailReport reset MAC, release the MAC configuration and re-establish RLC for all RBs that are established; and if the UE supports RRC Connection Establishment failure with temporary offset and the T300 has expired a consecutive connEstFailCount times on the same cell for which connEstFailureControl is included in SIB1, for a period as indicated by connEstFailOffsetValidity, use connEstFailOffset for the parameter Qoffsettemp for the concerned cell when performing cell selection and reselection according to TS 38.304 and TS 36.304.

Operation 2: Operation Related to VarConnEstFailReport if the UE has connection establishment failure information or connection resume failure information available in VarConnEstFailReport and if the RPLMN is not equal to plmn-identity stored in VarConnEstFailReport or if the cell identity of current cell is not equal to the cell identity stored in measResultFailedCell in VarConnEstFailReport, reset the numberOfConnFail to 0;

clear the content included in VarConnEstFailReport except for the numberOfConnFail, if any; and store the following connection establishment failure information in the VarConnEstFailReport by setting its fields as follows:

set the plmn-Identity to the PLMN selected by upper layers (see TS 24.501) from the PLMN(s) included in the plmn-IdentityList in SIB1;

set the measResultFailedCell to include the global cell identity, tracking area code, the cell level and SS/PBCH block level RSRP, and RSRQ, and SS/PBCH block indexes, of the failed cell based on the available SSB measurements collected up to the moment the UE detected connection establishment failure; and if available, set the measResultNeighCells, in order of decreasing ranking-criterion as used for cell reselection, to include neighbouring cell measurements for at most the following number of neighbouring cells: 6 intra-frequency and 3 inter-frequency neighbours per frequency as well as 3 inter-RAT neighbours, per frequency/set of frequencies per RAT and according to the following:

for each neighbour cell included, include the optional fields that are available;

if available, set the locationInfo as follows:

if available, set the commonLocationInfo to include the detailed location information;

if available, set the bt-LocationInfo to include the Bluetooth measurement results, in order of decreasing RSSI for Bluetooth beacons;

if available, set the wlan-LocationInfo to include the WLAN measurement results, in order of decreasing RSSI for WLAN Aps; and if available, set the sensor-LocationInfo to include the sensor measurement results as follows:

if available, include the sensor-MeasurementInformation; and if available, include the sensor-MotionInformation;

set perRAInfoList to indicate random access failure information; and if the numberOfConnFail is smaller than 7, increment the numberOfConnFail by 1;

inform upper layers about the failure to establish the RRC connection, upon which the procedure ends.

In step 6-50, the UE 6-01 in the RRC idle mode may initiate an RRC connection establishment procedure with the NR cell 6-03. Upon initiation of the RRC connection establishment procedure, the UE may start the T300 timer.

In step 6-55, the T300 timer driven by the UE in step 6-50 may expire.

In step 6-60, the UE may sequentially perform operations 1 and 2 described above. The UE logging single RRC connection/resume failure information may have the following features.

The UE may store the single RRC connection/resume failure information in VarconnestFaileport for the most recent failed cell 6-03. To this end, the UE may erase all of the information except for information (for example, numberOfConnFail) indicating the number of consecutive RRC connection establishment/resume failures in the same cell among the RRC connection establishment/resume failure information stored in VarconnestFaileport in step 6-45, and store the RRC connection establishment/resume failure information in the VarConnEstFailReport for the cell 6-03 that failed to establish/resume the RRC connection in step 6-55. When the cell 6-02 that failed to establish/resume the RRC connection in step 6-40 is different from the cell 6-03 that failed to establish/resume the RRC connection in step 6-55, or when the plmn-Identity stored in the VarConnEstFailReport in step 6-45 is not RPLMN, the numberOfConnFail may be reset to 0. The UE may determine whether the current cell and the most recently failed cell are the same through comparison of the cell identifier of the current cell and the cell identifier stored in the information (for example, meas-ResultFailedCell) indicating the last measurement result performed in the cell in which the RRC connection establishment/resume failure of the VarConnEstFailReport occurred. When the cell 6-02 that failed to establish/resume the RRC connection in step 6-40 and the cell 6-03 that failed to establish/resume the RRC connection in step 6-55 are the same, the UE may increase the numberOfConnFail set in step 6-45 by 1 without resetting the numberOfConnFail.

In step 6-65, the UE 6-01 in the RRC idle mode may initiate the RRC connection establishment procedure with the NR cell 6-02. Upon initiation of the RRC connection establishment procedure, the UE may start a T300 timer.

In step 6-70, the UE 6-01 in the RRC idle mode may transmit an RRC connection request (RRCSetupRequest) message to the NR cell 6-02.

In step 6-75, the NR cell 6-02 may transmit an RRC connection (RRCSetup) message to the UE 6-01 in the RRC idle mode.

In step 6-76, the UE 6-01 may stop the running T300 timer. In addition, the UE 6-01 may transition to the RRC connected mode.

In step 6-80, when the connection establishment/resume failure information is stored in the VarConnEstFailReport, and plmn-Identity stored in the VarConnEstFailReport matches the RPLMN, the UE 6-01 that has transitioned to the RRC connected mode may transmit an RRC connection complete (RRCSetupComplete) message by including an indicator (for example, connEstFailInfoAvailable) notifying the same to the NR cell 6-02.

In step 6-85, the NR cell 6-02 may transmit a UEInformationRequest message to the UE 6-01 by setting the information (for example, connEstFailReportReq) indicating whether to report information on RRC connection establishment/resume failure as true in the message (UEInformationRequest message) for requesting information from the UE.

In step 6-90, when connEstFailReportReq is set to true in the received UEInformationRequest message, the connection establishment/resume failure information is stored in the VarConnEstFailReport, and the plmn-Identity stored in the VarConnEstFailReport is the same as the RPLMN, the UE 6-01 may transmit a message (UEInformationResponse message) for reporting information requested by the base station to the NR cell by performing the following operations:

set timeSinceFailure in VarConnEstFailReport to the time that elapsed since the last connection establishment failure in NR; and set the connEstFailReport in the UEInformationResponse message to the value of connEstFailReport in VarConnEstFailReport.

The UE may discard the connEstFailReport from VarConnEstFailReport upon successful delivery of the UEInformationResponse message confirmed by lower layers.

Figure 7:
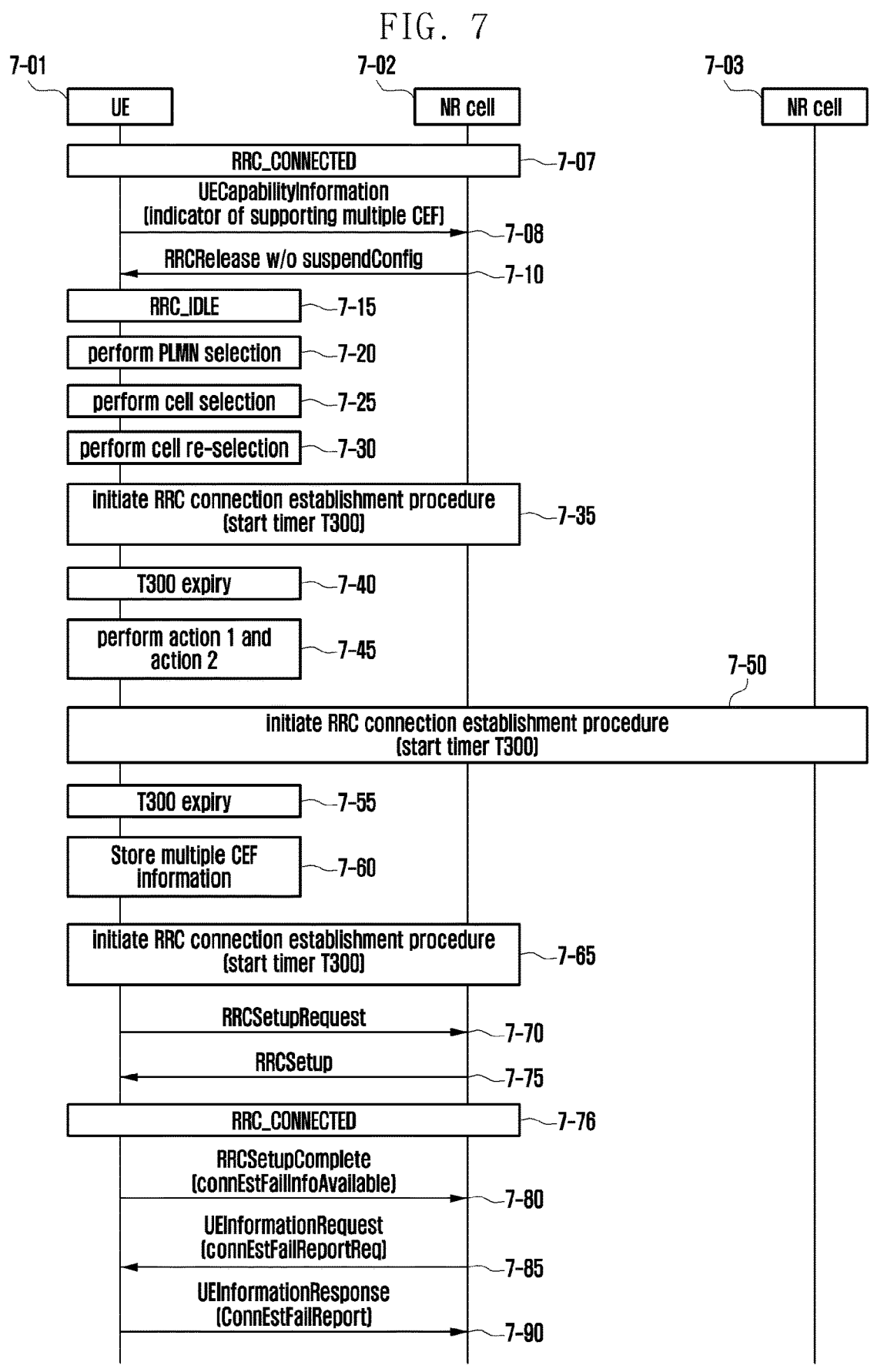
FIG. 7 illustrates a flowchart of a process in which a UE stores and reports multiple RRC connection establishment/resume failure information to an NR base station in an NR system according to an embodiment of the present disclosure.

FIG. 7 illustrates a process in which a UE stores and reports multiple RRC connection establishment/resume failure information to an NR cell in an NR system according to an embodiment of the present disclosure.

In FIG. 7, not all of the steps described below must be included according to configurations and/or definitions on the system, and some steps may be omitted.

A UE according to an embodiment of the disclosure may store multiple RRC connection establishment/resume failure information (multiple connection establishment/resume failure information, hereinafter multiple CEF) and transmit the same to an NR cell. Through this, the operator may optimize the network by identifying and solving the coverage imbalance problem of downlink (hereinafter, DL) and uplink (hereinafter, UL) of the base station. In the present disclosure, a method for a UE to store multiple CEFs and report the same to a base station is provided.

Referring to FIG. 7, in step 7-07, a UE 7-01 may be in an RRC connected mode (RRC_CONNECTED) by establishing an RRC connection with an NR cell 7-02.

In step 7-08, the UE 7-01 in the RRC connected mode may transmit a UE capability information message (UECapabilityInformation) to the NR cell 7-02. The message may include an indicator indicating whether the UE has the ability to store and report multiple CEFs (to the NR base station).

In step 7-10, the NR cell 7-02 may transmit an RRC connection release message (RRCRelease) not including suspend configuration information (suspendConfig) to the UE 7-01.

In step 7-15, the UE 7-01 receiving the RRCRelease message may transition to the RRC idle mode (RRC_IDLE).

In step 7-20, the UE 7-01 in the RRC idle mode may perform a PLMN selection process.

In step 7-25, the UE 7-01 in the RRC idle mode may perform a cell selection process to camp-on a suitable cell for the selected or registered PLMN.

In step 7-30, the UE 7-01 in the RRC idle mode may perform a cell re-selection process to find a better suitable cell.

In step 7-35, the UE 7-01 in the RRC idle mode may initiate an RRC connection establishment procedure with the NR cell 7-02. Upon initiation of the RRC connection establishment procedure, the UE may start a T300 timer.

In step 7-40, the T300 timer driven by the UE in step 7-35 may expire.

In step 7-45, the UE may sequentially perform operations 1 and 2 according to the embodiment of FIG. 6 described above.

In step 7-50, the UE 7-01 in the RRC idle mode may initiate an RRC connection establishment procedure with the NR cell 7-03. Upon initiation of the RRC connection establishment procedure, the UE may start the T300 timer.

In step 7-55, the T300 timer driven by the UE in step 7-50 may expire.

In step 7-60, when the T300 timer expires, the UE 7-01 may store the RRC connection establishment/resume failure information that has failed in multiple cells. A UE supporting the multiple CEF functions may sequentially or independently perform at least one of the following operations to prevent reporting of duplicate CEF information to the base station when logging multiple RRC connection establishment/resume failure information.

Operation A: When RRC connection establishment/resume failure information is stored in a UE variable (VarConnEstFailReportList) including a list of the connection establishment failure and/or connection resume failure information, but the plmn-Identity and stored in VarConnEstFailReport or VarConnEstFailReportList is different from the RPLMN, the UE may clear all of the information stored in the VarConnEstFailReportList. The VarConnEstFailReport may be composed of the connEstFailReport and the plmn-Identity. For example, VarConnEstFailReport may be configured as illustrated in Table 2 below.

TABLE 2

```
VarConnEstFailReport-r16 ::= SEQUENCE {
    connEstFailReport-r16 ConnEstFailReport-r16,
    plmn-Identity-r16   PLMN-Identity
}
```

When the UE determines that RRC connection establishment/resume failure information is stored in the VarConnEstFailReportList but the plmn-Identity stored in the VarConnEstFailReport is different from the RPLMN, the VarConnEstFailReportList may be configured as illustrated in Table 3 below.

TABLE 3

```
VarConnEstFailReportList-r17 ::= SEQUENCE {
    connEstFailReportList-r17   SEQUENCE (SIZE (1..
maxCEFReport-1-r17)) OF ConnEstFailReport-r16
}
```

In Table 3, the maxCEF-Report may refer to the maximum number of CEF reports that may be stored by the UE. For example, the value of maxCEF-Report may be 8 and maxCEFReport-1 may be 7. The UE has an advantage of not needing to manage a separate plmn-Identity in the VarConnEstFailReportList.

When the UE determines that RRC connection establishment/resume failure information is stored in the VarConnEstFailReportList but the plmn-Identity stored in the VarConnEstFailReportList is different from the RPLMN, the VarConnEstFailReportList may be configured as illustrated in Table 4 below.

TABLE 4

```
VarConnEstFailReportLIST-r17 ::= SEQUENCE {
    connEstFailReportList-r17   SEQUENCE (SIZE (1..
maxCEFReport-1-r17)) OF ConnEstFailReport-r16
    plmn-Identity-r16   PLMN-Identity
}
```

For example, the value of maxCEF-Report may be 8 and maxCEFReport-1 may be 7. The UE may manage only one plmn-Identity in the VarConnEstFailReportList.

Operation B: When the current cell (the cell that failed to establish/resume the RRC connection) is different from the cell that failed to establish/resume the most recent RRC connection stored in the VarConnEstFailReport (it may be determined by cell identity), the UE may store (or append) the information stored in the VarConnEstFailReport to the VarConnEstFailReportList. For example, when the most recent cell 7-02 that failed to establish/resume the RRC connection in step 7-40 and the current cell 7-03 that failed to establish/resume the RRC connection in step 7-55 are different, the UE may store the RRC connection establishment/resume failure information stored in the VarConnEstFailReport for the NR cell 7-02 in step 7-45 in the VarConnEstFailReportList. The UE may perform the operation B only when the plmn-Identity stored in the VarConnEstFailReport or the VarConnEstFailReportList is the same as the RPLMN. According to an embodiment of the disclosure, the UE may store CEF information in the VarConnEstFailReportList up to maxCEFReport-1. For example, the UE may store the CEF information in the VarConnEstFailReportList only when maxCEFReport is not reached. In addition, when the UE stores the CEF information in the VarConnEstFailReportList up to maxCEFReport-1, the UE may erase the most previously stored CEF information and store new CEF information. Alternatively, when the UE stores the CEF information in the VarConnEstFailReportList up to maxCEFReport-1, the UE may no longer store the CEF information in the VarConnEstFailReportList.

Operation C: The RRC connection establishment/resume failure information for a cell in which the current RRC connection establishment/resume has failed may be stored in the VarConnEstFailReport according to the operation (e.g., operation 2) of the above-described embodiment. However, the UE may not store the VarConnEstFailReport in the VarConnEstFailReportList. For example, the UE may store the cell 7-03 in which the RRC connection establishment/resume has failed through the step 7-55 in the VarConnEstFailReport according to operation 2 of the above-described embodiment.

In step 7-65, the UE 7-01 in the RRC idle mode may initiate the RRC connection establishment procedure with the NR cell 7-02. Upon initiation of the RRC connection establishment procedure, the UE may start a T300 timer.

In step 7-70, the UE 7-01 in the RRC idle mode may transmit an RRC connection request (RRCSetupRequest) message to the NR cell 7-02.

In step 7-75, the NR cell 7-02 may transmit an RRC connection (RRCSetup) message to the UE 7-01 in the RRC idle mode.

In step 7-76, the UE 7-01 may stop the running T300 timer. In addition, the UE 7-01 may transition to the RRC connected mode.

In step 7-80, when the connection establishment/resume failure information is stored in the VarConnEstFailReport and/or the VarConnEstFailReportList, and plmn-Identity stored in the VarConnEstFailReport and/or the VarConnEstFailReportList matches the RPLMN, the UE 7-01 that has transitioned to the RRC connected mode may transmit an RRC connection complete (RRCSetupComplete) message by including an indicator (for example, connEstFailInfoAvailable) notifying the same to the NR cell 7-02.

In step 7-85, the NR cell 7-02 may transmit a UEInformationRequest message to the UE 7-01 by setting the information (for example, connEstFailReportReq) indicating whether to report information on RRC connection establishment/resume failure as true in the message (UEInformationRequest message) for requesting information from the UE.

In step 7-90, when connEstFailReportReq is set to true in the received UEInformationRequest message, the connection establishment/resume failure information is stored in the VarConnEstFailReport and/or the VarConnEstFailReportList, and the plmn-Identity stored in the VarConnEstFailReport, and/or the VarConnEstFailReportList is the same as the RPLMN, the UE 7-01 may transmit a message (UEInformationResponse message) for reporting information requested by the base station to the NR cell by performing at least one of the following operations:

set timeSinceFailure in VarConnEstFailReport to the time that elapsed since the last connection establishment failure in NR;

set the connEstFailReport in the UEInformationResponse message to the value of connEstFailReport in VarConnEstFailReport; and set the connEstFailReportList in the UEInformationResponse message to the value of connEstFailReportList in VarConnEstFailReportList (In this case, the UE may set timeSinceFailure for the time that has passed since the (most recent) RRC connection establishment/resume failure in NR for individual connEstFailReport included in the connEstFailReportList. For example, the UE may set the time that has passed from step 7-40 to now as the timeSinceFailure).

The UE may discard the connEstFailReport from VarConnEstFailReport and/or the connEstFailReportList from VarConnEstFailReportList upon successful delivery of the UEInformationResponse message confirmed by lower layers.

Figure 8:
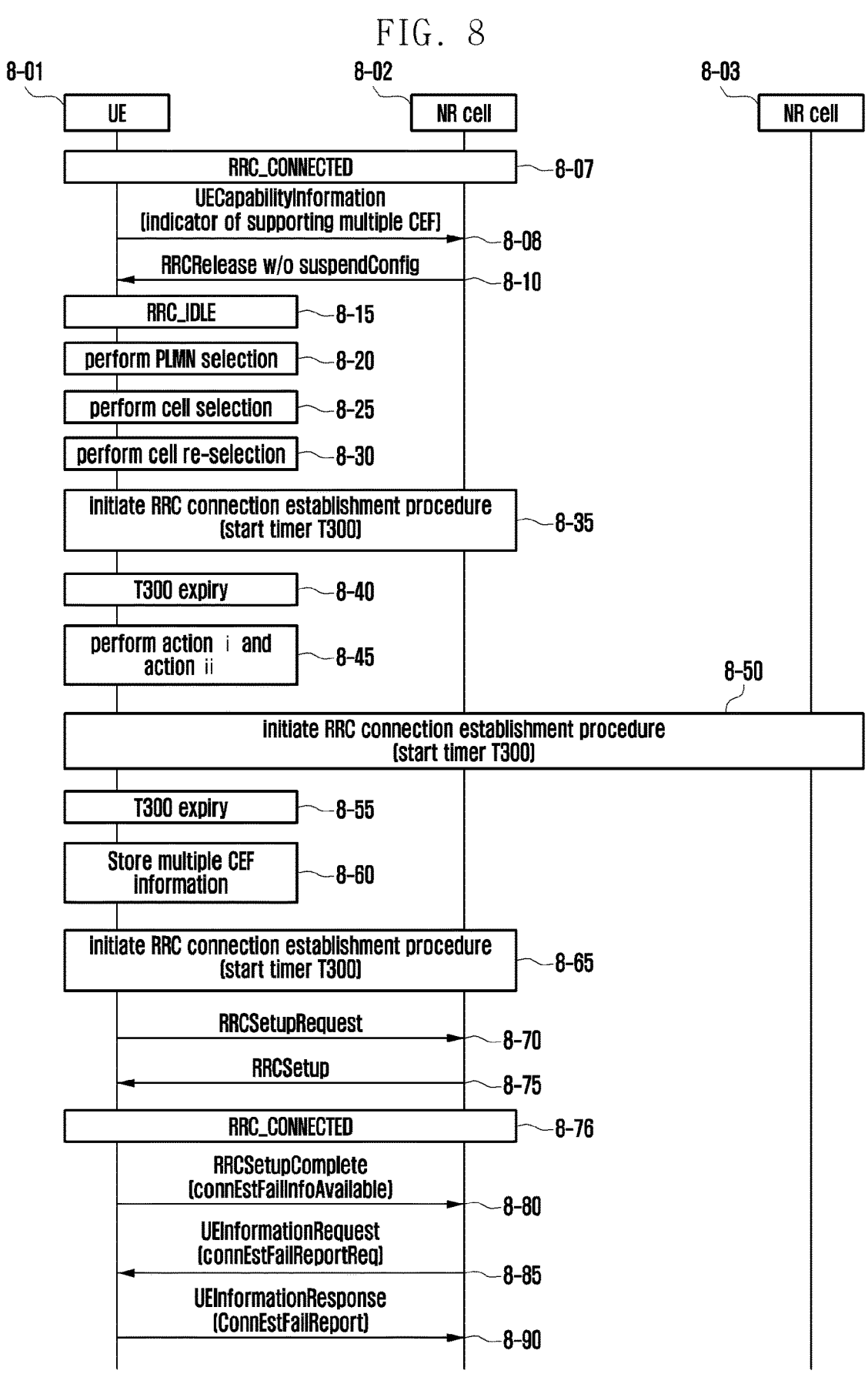
FIG. 8 illustrates a flowchart of a process in which a UE stores and reports multiple RRC connection establishment/resume failure information to an NR base station in an NR system according to an embodiment of the present disclosure.

FIG. 8 illustrates a process in which a UE stores and reports multiple RRC connection establishment/resume failure information to an NR cell in an NR system according to an embodiment of the present disclosure.

In FIG. 8, not all of the steps described below must be included according to configurations and/or definitions on the system, and some steps may be omitted.

A UE according to an embodiment of the disclosure may store multiple RRC connection establishment/resume failure information (multiple connection establishment/resume failure information, hereinafter multiple CEF) and transmit the same to an NR cell. Through this, the operator may optimize the network by identifying and solving the coverage imbalance problem of downlink (hereinafter, DL) and uplink (hereinafter, UL) of the base station. In the present disclosure, a method for a UE to store multiple CEFs and report the same to a base station is provided.

Referring to FIG. 8, in step 8-07, a UE 8-01 may be in an RRC connected mode (RRC_CONNECTED) by establishing an RRC connection with an NR cell 8-02.

In step 8-08, the UE 8-01 in the RRC connected mode may transmit a UE capability information message (UECapabilityInformation) to the NR cell 8-02. The message may include an indicator indicating that the UE has the ability to store and report multiple CEFs to the NR base station.

In step 8-10, the NR cell 8-02 may transmit an RRC connection release message (RRCRelease) not including suspend configuration information (suspendConfig) to the UE 8-01.

In step 8-15, the UE 8-01 receiving the RRCRelease message may transition to the RRC idle mode (RRC_IDLE).

In step 8-20, the UE 8-01 in the RRC idle mode may perform a PLMN selection process.

In step 8-25, the UE 8-01 in the RRC idle mode may perform a cell selection process to camp-on a suitable cell for the selected or registered PLMN.

In step 8-30, the UE 8-01 in the RRC idle mode may perform a cell re-selection process to find a better suitable cell.

In step 8-35, the UE 8-01 in the RRC idle mode may initiate an RRC connection establishment procedure with the NR cell 8-02. Upon initiation of the RRC connection establishment procedure, the UE may start a T300 timer.

In step 8-40, the T300 timer driven by the UE in step 8-35 may expire.

In step 8-45, the UE may sequentially perform following operations i and ii.

Operation i: Operation unrelated to VarConnEstFailReport/VarConnEstFailReportList reset MAC, release the MAC configuration and re-establish RLC for all RBs that are established; and if the UE supports RRC Connection Establishment failure with temporary offset and the T300 has expired a consecutive connEstFailCount times on the same cell for which connEstFailureControl is included in SIB1, for a period as indicated by connEstFailOffsetValidity, use connEstFailOffset for the parameter Qoffsettemp for the concerned cell when performing cell selection and reselection according to TS 38.304 and TS 36.304.

Operation ii: Operation related to VarConnEstFailReport/VarConnEstFailReportList if the UE has connection establishment failure information or connection resume failure information available in VarConnEstFailReport and if the RPLMN is not equal to plmn-identity stored in VarConnEstFailReport or if the cell identity of current cell is not equal to the cell identity stored in measResultFailedCell in VarConnEstFailReport, reset the numberOfConnFail to 0;

if the UE has connection establishment failure information or connection resume failure information available in VarConnEstFailReportList and if the RPLMN is not equal to plmn-identity stored in VarConnEstFailReport or VarConnEstFailReportList, clear the content included in VarConnEstFailReportList;

clear the content included in VarConnEstFailReport except for the numberOfConnFail, if any; and store the following connection establishment failure information in the VarConnEstFailReport by setting its fields as follows:

set the plmn-Identity to the PLMN selected by upper layers (see TS 24.501) from the PLMN(s) included in the plmn-IdentityList in SIB1;

set the measResultFailedCell to include the global cell identity, tracking area code, the cell level and SS/PBCH block level RSRP, and RSRQ, and SS/PBCH block indexes, of the failed cell based on the available SSB measurements collected up to the moment the UE detected connection establishment failure; and if available, set the measResultNeighCells, in order of decreasing ranking-criterion as used for cell reselection, to include neighbouring cell measurements for at most the following number of neighbouring cells: 6 intra-frequency and 3 inter-frequency neighbours per frequency as well as 3 inter-RAT neighbours, per frequency/set of frequencies per RAT and according to the following:

for each neighbour cell included, include the optional fields that are available;

if available, set the locationInfo as follows:

if available, set the commonLocationInfo to include the detailed location information; and if available, set the bt-LocationInfo to include the Bluetooth measurement results, in order of decreasing RSSI for Bluetooth beacons;

if available, set the wlan-LocationInfo to include the WLAN measurement results, in order of decreasing RSSI for WLAN APs;

if available, set the sensor-LocationInfo to include the sensor measurement results as follows:

if available, include the sensor-MeasurementInformation; and if available, include the sensor-MotionInformation;

set perRAInfoList to indicate random access failure information;

if the numberOfConnFail is smaller than 7, increment the numberOfConnFail by 1;

if the UE supports multiple CEF report:

if the cgi-Info in the measResultFailedCell in the newly added VarConnEstFailReport (or in the newly added ConnEstFailReport in connEstFailReportList in VarConnEstFailReportList) the same as the cgi-Info in the measResultFailedCell in the last entry in the VarConnEstFailReportList:

except for the nummberOfConnFail, replace all information for the entry with the VarConnEstFailReport (or for the entry with ConnEstFailReport);

else:

if the maxCEFReport-r17 has not been reached:

append the VarConnEstFailReport (or ConnEstFailReport) as a new entry in the VarConnEstFailReportList;

inform upper layers about the failure to establish the RRC connection, upon which the procedure ends.

According to an embodiment of the disclosure, the VarConnEstFailReportList may be configured as one of Table 5 or Table 6 below (or may be configured as described above in FIG. 7).

TABLE 5

| VarConnEstFailReportList-r17 ::= SEQUENCE { |
| connEstFailReportList-r17 SEQUENCE (SIZE (1.. |
| maxCEFReport-r17)) OF VarConnEstFailReport-r16 |
| } |

TABLE 6

| VarConnEstFailReportList-r17 ::= SEQUENCE { |
| connEstFailReportList-r17 SEQUENCE (SIZE (1.. |
| maxCEFReport-r17)) OF ConnEstFailReport-r16 |
| plmn-Identity-r16 PLMN-Identity |
| } |

In step 8-50, the UE 8-01 in the RRC idle mode may initiate an RRC connection establishment procedure with the NR cell 8-03. Upon initiation of the RRC connection establishment procedure, the UE may start the T300 timer.

In step 8-55, the T300 timer driven by the UE in step 8-50 may expire.

In step 8-60, when the T300 timer expires, the UE 8-01 may store the RRC connection establishment/resume failure information that has failed in multiple cells. According to an embodiment, a UE supporting the multiple CEF functions may store duplicated CEF information when logging multiple RRC connection establishment/resume failure information. Specifically, the following operations may be considered.

The ConnEstFailReport (last entry with ConnEstFailReport in connEstFailReportList in VarConnEstFailReportList) stored in the last entry of the VarConnEstFailReportList may have the same value as the ConnEstFailReport stored in the VarConnEstFailReport. Alternatively, the VarConnEstFailReport stored in the last entry of the VarConnEstFailReportList may be the same as the value stored in the VarConnEstFailReport. For example, the RRC connection establishment/resume failure information for the cell 8-03 in which RRC connection establishment/resume has failed through step 8-55 may be stored in the VarConnEstFailReportList and also in the VarConnEstFailReport.

The UE may store the RRC connection establishment/resume failure information for a cell in which RRC connection establishment/resume has failed in the VarConnEstFailReportList. For example, the UE may store the RRC connection establishment/resume failure information for the cell 8-02 in which RRC connection establishment/resume has failed through step 8-40 in the VarConnEstFailReportList. In addition, when the cell in which the current RRC connection establishment/resume has failed is the same as the cell in which the most recent RRC connection establishment/resume has failed (for example, when cells 8-02 and 8-03 are the same), the UE may then erase all of the information except for the numberOfConnFail, and replace the numberOfConnFail with the RRC connection establishment/resume failure information for the cell in which the current RRC connection establishment/resume has failed, and store the same in the VarConnEstFailReportList.

That is, without adding a new entry to the VarConnEstFailReportList, existing information may be replaced with the RRC connection establishment/resume failure information for a cell in which RRC connection establishment/resume has failed. When the cell in which the current RRC connection establishment/resume has failed is different from the cell in which the most recent RRC connection establishment/resume has failed (for example, when cells 8-02 and 8-03 are different), the UE may store the RRC connection establishment/resume failure information for a cell in which RRC connection establishment/resume has failed in the VarConnEstFailReportList as a new entry. Up to maxCEFReport-r17 entries (i.e., each CEF value) may be stored in the VarConnEstFailReportList.

In step 8-65, the UE 8-01 in the RRC idle mode may initiate the RRC connection establishment procedure with the NR cell 8-02. Upon initiation of the RRC connection establishment procedure, the UE may start a T300 timer.

In step 8-70, the UE 8-01 in the RRC idle mode may transmit an RRC connection request (RRCSetupRequest) message to the NR cell 8-02.

In step 8-75, the NR cell 8-02 may transmit an RRC connection (RRCSetup) message to the UE 8-01 in the RRC idle mode.

In step 8-76, the UE 8-01 may stop the running T300 timer. In addition, the UE 8-01 may transition to the RRC connected mode.

In step 8-80, when the connection establishment/resume failure information is stored in the VarConnEstFailReport and/or the VarConnEstFailReportList, and plmn-Identity stored in the VarConnEstFailReport and/or the VarConnEstFailReportList matches the RPLMN, the UE 8-01 that has transitioned to the RRC connected mode may transmit an RRC connection complete (RRCSetupComplete) message by including an indicator (for example, connEstFailInfoAvailable) notifying the same to the NR cell 8-02.

In step 8-85, the NR cell 8-02 may transmit a UEInformationRequest message to the UE 8-01 by setting the information (for example, connEstFailReportReq) indicating whether to report information on RRC connection establishment/resume failure in the message (UEInformationRequest message) for requesting information from the UE as true. According to an embodiment of the disclosure, in step 8-85, the NR cell 8-02 may set an indicator to true to report multiple CEFs in the UEInformationRequest message.

In step 8-90, when connEstFailReportReq is set to true in the received UEInformationRequest message, the connection establishment/resume failure information is stored in the VarConnEstFailReport and/or the VarConnEstFailReportList, and the plmn-Identity stored in the VarConnEstFailReport, and/or the VarConnEstFailReportList is the same as the RPLMN, the UE 8-01 may transmit a message (UEInformationResponse message) for reporting information requested by the base station to the NR cell by performing following operations:

set timeSinceFailure in VarConnEstFailReport to the time that elapsed since the last connection establishment failure in NR;

set the connEstFailReport in the UEInformationResponse message to the value of connEstFailReport in VarConnEstFailReport; and set the connEstFailReportList in the UEInformation message to the value of connEstFailReportList in VarConnEstFailReportList, except the last entry in the connEstFailReportList in VarConnEstFailReportList (that is, the UE may exclude the connEstFailReport or the VarConnEstFailReport in the last entry of the connEstFailReportList stored in the VarConnEstFailReportList. According to an embodiment of the disclosure, the UE may set timeSinceFailure for the time that has passed since the RRC connection establishment/resume failure in NR for each connEstFailReport included in the connEstFailReportList. For example, the UE may set the time that has passed from step 8-40 to now as the timeSinceFailure).

The UE may discard the connEstFailReport from VarConnEstFailReport and/or the connEstFailReportList from VarConnEstFailReportList upon successful delivery of the UEInformationResponse message confirmed by lower layers.

In step 8-90, when the indicator to report multiple CEFs in the received UEInformationRequest message is true, there is connection establishment/resume failure information in the VarConnEstFailReport and/or the VarConnEstFailReportList, and the plmn-Identity stored in the VarConnEstFailReport and/or the VarConnEstFailReportList is the same as RPLMN, the UE 8-01 may transmit the UEInformationResponse message to the NR cell by performing the following operation:

set the connEstFailReportList in the UEInformationResponse message to the value of connEstFailReportList in VarConnEstFailReportList (In this case, the UE may set timeSinceFailure for the time that has passed since the RRC connection establishment/resume failure in NR for each connEstFailReport included in the connEstFailReportList. For example, the UE may set the time that has passed from step 8-40 to now as the timeSinceFailure). That is, the UE may transmit only information stored in the VarConnEstFailReportList to the UEInformationResponse message, and may not transmit information stored in the VarConnEstFailReport to the UEInformationResponse message.

The UE may discard the connEstFailReport from VarConnEstFailReport and/or the connEstFailReportList from VarConnEstFailReportList upon successful delivery of the UEInformationResponse message confirmed by lower layers.

Figure 9:
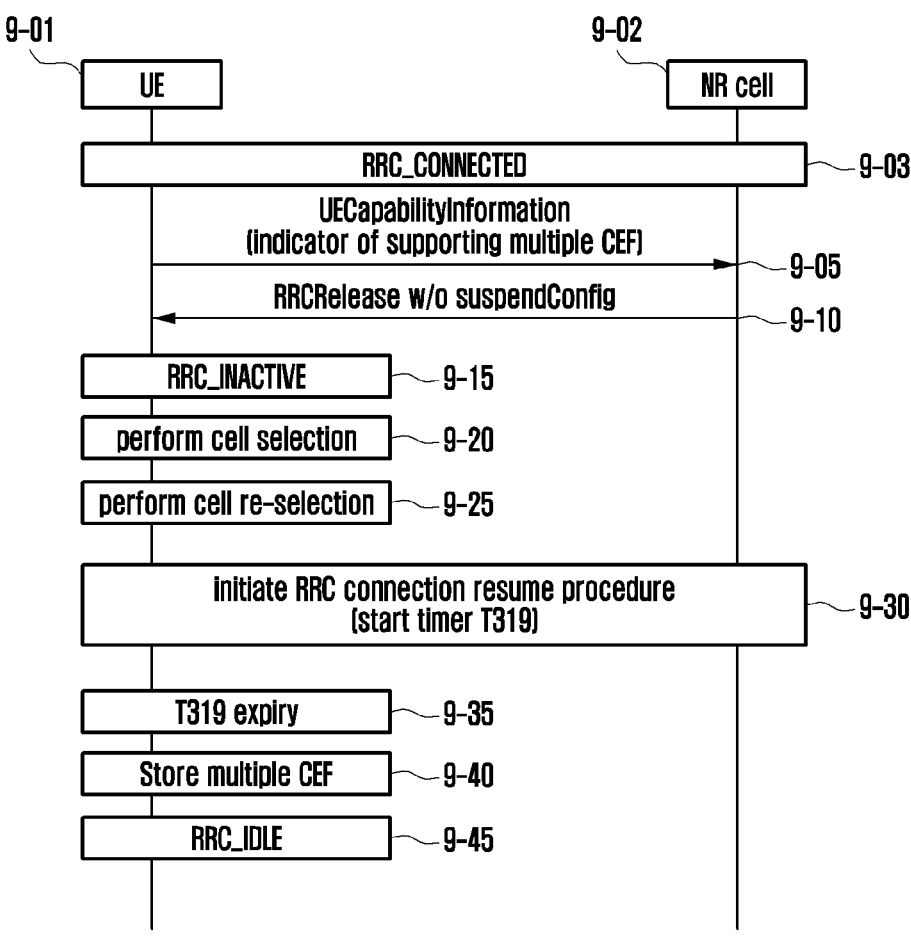
FIG. 9 illustrates a flowchart of a process in which a UE stores and reports multiple RRC connection establishment/resume failure information to an NR cell in an NR system according to an embodiment of the present disclosure.

FIG. 9 illustrates a process in which a UE stores and reports multiple RRC connection establishment/resume failure information to an NR cell in an NR system according to an embodiment of the disclosure.

In FIG. 9, not all of the steps described below must be included according to configurations and/or definitions on the system, and some steps may be omitted.

A UE according to an embodiment of the disclosure may store multiple RRC connection establishment/resume failure information (multiple connection establishment/resume failure information, hereinafter, multiple CEF) and transmit the same to an NR cell. Through this, the operator may optimize the network by identifying and solving the coverage imbalance problem of downlink (hereinafter, DL) and uplink (hereinafter, UL) of the base station. In the present disclosure, a method for a UE to store multiple CEFs and report the same to a base station is provided.

Referring to FIG. 9, in step 9-03, a UE 9-01 may be in an RRC connected mode (RRC_CONNECTED) by establishing an RRC connection with an NR cell 9-02.

In step 9-05, the UE 9-01 in the RRC connected mode may transmit a UE capability information message (UECapabilityInformation) to the NR cell 9-02. The message may include an indicator indicating that the UE has the ability to store and report multiple CEFs to the NR base station.

In step 9-10, the NR cell 9-02 may transmit an RRC connection release message (RRCRelease) not including suspend configuration information (suspendConfig) to the UE 9-01.

In step 9-15, the UE 9-01 receiving the RRCRelease message may transition to the RRC inactive mode (RRC INACTIVE).

In step 9-20, the UE 9-01 in the RRC idle mode may perform a cell selection process to camp-on a suitable cell for the selected or registered PLMN.

In step 9-25, the UE 9-01 in the RRC idle mode may perform a cell re-selection process to find a better suitable cell.

In step 9-30, the UE 9-01 in the RRC idle mode may initiate an RRC connection establishment procedure with the NR cell 9-02. Upon initiation of the RRC connection establishment procedure, the UE may start a T319 timer.

In step 9-35, the T319 timer driven by the UE in step 9-30 may expire.

In step 9-40, the UE may perform operation A, operation B, and/or operation C according to the embodiment of FIG. 7 or operation ii according to the embodiment of FIG. 8 to store multiple CEFs.

In step 9-45, the UE may transition to RRC idle mode (RRC_IDLE).

Figure 10:
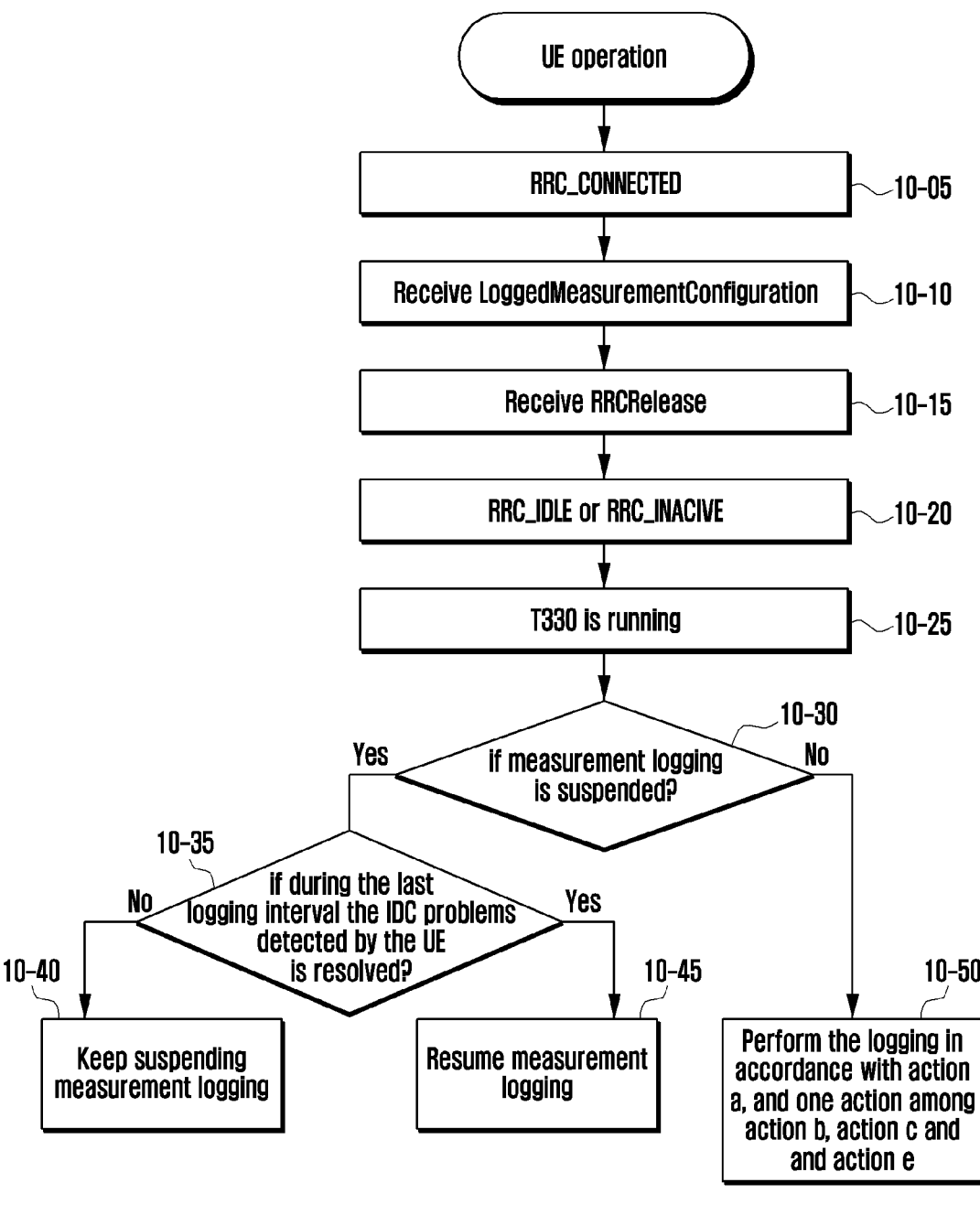
FIG. 10 illustrates a flowchart in which a UE performs a measurement logging according to an embodiment of the present disclosure.

FIG. 10 illustrates a flowchart illustrating an operation of storing a measurement result by a UE according to an embodiment of the present disclosure.

In FIG. 10, not all of the steps described below must be included according to configurations and/or definitions on the system, and some steps may be omitted.

Referring to FIG. 10, in step 10-05, the UE may establish an RRC connection with the NR base station and be in RRC connected mode (RRC_CONNECTED).

In step 10-10, the RRC connected mode UE may receive a LoggedMeasurementConfiguration message from the NR base station.

Upon receiving the message, the UE may perform the following procedure:

1> discard the logged measurement configuration as well as the logged measurement information;

1> store the received loggingDuration, reportType and areaConfiguration, if included, in VarLogMeasConfig;

1> if the LoggedMeasurementConfiguration message includes plmn-IdentityList:

2> set plmn-IdentityList in VarLogMeasReport to include the RPLMN as well as the PLMNs included in plmn-IdentityList;

1> else:

2> set plmn-IdentityList in VarLogMeasReport to include the RPLMN;

1> store the received absoluteTimeInfo, traceReference, traceRecordingSessionRef, tce-Id, and sigLogged-MeasType in VarLogMeasReport;

1> store the received bt-NameList, if included, in Var-LogMeasConfig;

1> store the received wlan-NameList, if included, in VarLogMeasConfig;

1> store the received sensor-NameList, if included, in VarLogMeasConfig;

1> start timer T330 with the timer value set to the loggingDuration; and

1> store the received earlyMeasIndication, if included, in VarLogMeasConfig.

In steps 10-15, the UE may receive an RRC connection release message (RRCRelease) from the NR base station.

In steps 10-20, the UE may transition to the RRC idle mode (RRC_IDLE) or the RRC inactive mode (RRC INAC-TIVE) according to the above-described embodiment.

In step 10-25, the T330 timer started in step 10-10 may continue to run.

In steps 10-30, the RRC idle mode or RRC inactive mode UE may determine whether measurement logging is suspended.

When it is determined in step 10-30 that the measurement logging is suspended, the UE may determine whether in-device coexistence (IDC) problems detected by the UE are resolved during the last logging interval in step 10-35.

In step 10-35, when the UE determines that the IDC problems detected by the UE are not resolved during the most recent logging interval, the UE may continue to suspend the measurement logging in step 10-40.

In step 10-35, when the UE determines that the IDC problems detected by the UE are resolved during the most recent logging interval, the measurement logging may be resumed in step 10-45.

When it is determined that the measurement logging is not suspended in step 10-30 or the measurement logging is resumed in step 10-45, the UE may perform the measurement logging in step 10-50. Specifically, the UE may perform the measurement logging by performing operation a, one of [operation b, operation c, operation d], and operation e. The difference between operation b, operation c, and operation d is as follows.

Operation b: If the UE detects IDC problems during the last logging interval, the UE may perform the measurement logging including inDeviceCoexDetected regardless of whether the measurement result of the serving cell exists in the VarLogMeasReport, and suspend the measurement logging from the next logging interval. There is an advantage of notifying the base station that an IDC problem has occurred by performing measurement logging even though IDC problems have been detected during the last logging interval because the UE may selectively include the measurement result of the serving cell in the LogMeasInfo.

Operation c: If the UE detects IDC problems during the last logging interval, the UE may perform the measurement logging including the inDeviceCoexDetected only when there is a measurement result of the serving cell in the VarLogMeasReport or when the reportType is configured to eventTriggered, and suspend the measurement logging from the next logging interval. When the reportType is configured to the eventTriggered, there is an advantage that the UE is able to notify the base station that an event (outOfCoverage or eventL1) has occurred and that an IDC problem has occurred, although a situation in which there is no measurement result of the serving cell may occur.

Operation d: If the UE detects IDC problems during the last logging interval, the UE may perform the measurement logging including the inDeviceCoexDetected only when there is a measurement result of the serving cell in the VarLogMeasReport or when the reportType is configured to the eventTriggered and the corresponding eventType is configured to the outOfCoverage, and suspend the measurement logging from the next logging interval. This is because when the eventType is outOfCoverage, there may be multiple cases in which there is no measurement result of the serving cell in the VarLogMeasReport.

Detailed descriptions of operation a to operation e are as follows:

Operation a:

2> if the reportType is set to periodical in the VarLog-MeasConfig:

3> if the UE is in any cell selection state (as specified in TS 38.304):

4> perform the logging at regular time intervals, as defined by the loggingInterval in the VarLog-MeasConfig;

3> if the UE is in camped normally state on an NR cell and if the RPLMN is included in plmn-IdentityList stored in VarLogMeasReport:

4> if areaConfiguration is not included in VarLog-MeasConfig; or

4> if the serving cell is part of the area indicated by areaConfig in areaConfiguration in VarLog-MeasConfig:

5> perform the logging at regular time intervals, as defined by the loggingInterval in the VarLog-MeasConfig;

2> else if the reportType is set to eventTriggered, and eventType is set to outOfCoverage:

3> perform the logging at regular time intervals as defined by the loggingInterval in VarLogMeasConfig only when the UE is in any cell selection state;

3> upon transition from any cell selection state to camped normally state in NR:

4> if the RPLMN is included in plmn-IdentityList stored in VarLogMeasReport; and 4> if areaConfiguration is not included in VarLog-MeasConfig or if the current camping cell is part of the area indicated by areaConfig of areaCon-figuration in VarLogMeasConfig:

5> perform the logging;

2> else if the reportType is set to eventTriggered and eventType is set to eventL1:

3> if the UE is in camped normally state on an NR cell and if the RPLMN is included in plmn-IdentityList stored in VarLogMeasReport:

4> if areaConfiguration is not included in VarLog-MeasConfig; or

4> if the serving cell is part of the area indicated by areaConfig in areaConfiguration in VarLog-MeasConfig:

5> perform the logging at regular time intervals as defined by the loggingInterval in VarLog-MeasConfig only when the conditions indicated by the eventL1 are met;

2> when performing the logging:

Operation b:

3> if the UE detected IDC problems during the last logging interval:

4> include inDeviceCoexDetected;

4> suspend measurement logging from the next logging interval;

Operation c:

3> if the UE detected IDC problems during the last logging interval:

4> if measResultServingCell in VarLogMeasReport is not empty; or

4> if the reportType is set to eventTriggered:

5> include inDeviceCoexDetected;

5> suspend measurement logging from the next logging interval;

4> else:

5> suspend measurement logging;

Operation d:

3> if the UE detected IDC problems during the last logging interval:

4> if measResultServingCell in VarLogMeasReport is not empty; or

4> if the reportType is set to eventTriggered, and eventType is set to outOfCoverage:

5> include inDeviceCoexDetected;

5> suspend measurement logging from the next logging interval;

4> else:

5> suspend measurement logging;

Operation e:

3> set the relativeTimeStamp to indicate the elapsed time since the moment at which the logged measurement configuration was received;

3> if location information became available during the last logging interval, set the content of the locationInfo:

3> if the UE is in any cell selection state (as specified in TS 38.304):

4> set anyCellSelectionDetected to indicate the detection of no suitable or no acceptable cell found;

4> if the reportType is set to eventTriggered in the VarLogMeasConfig; and

4> if the RPLMN at the time of entering the any cell selection state is included in plmn-IdentityList stored in VarLogMeasReport; and 4> if areaConfiguration is not included in VarLog-MeasConfig or if the last suitable cell that the UE was camping on is part of the area indicated by areaConfig of areaConfiguration in VarLog-MeasConfig:

5> set the servCellIdentity to indicate global cell identity of the last suitable cell that the UE was camping on;

5> set the measResultServingCell to include the quantities of the last suitable cell the UE was camping on;

4> else if the reportType is set to periodical in the VarLogMeasConfig:

5> set the servCellIdentity to indicate global cell identity of the last logged cell that the UE was camping on;

5> set the measResultServingCell to include the quantities of the last logged cell the UE was camping on;

3> else:

4> set the servCellIdentity to indicate global cell identity of the cell the UE is camping on;

4> set the measResultServingCell to include the quantities of the cell the UE is camping on;

3> if available, set the measResultNeighCells, in order of decreasing ranking-criterion as used for cell re-selection, to include measurements of neighbouring cell that became available during the last logging interval and according to the following:

4> include measurement results for at most 6 neighbouring cells on the NR serving frequency and for at most 3 cells per NR neighbouring frequency and for the NR neighbouring frequencies in accordance with the following:

5> if interFreqTargetInfo is included in VarLog-MeasConfig:

6> if earlyMeasIndication is included in VarLog-MeasConfig;

7> include measurement results for NR neighbouring frequencies that are included in both interFreqTargetInfo and either in measIdleCarrierListNR or SIB4;

6> else:

7> include measurement results for NR neighbouring frequencies that are included in both interFreqTargetInfo and SIB4;

5> else:

6> if earlyMeasIndication is included in VarLog-MeasConfig;

7> include measurement results for NR neighbouring frequencies that are included in measIdleCarrierListNR or SIB4;

6> else:

7> include measurement results for NR neighbouring frequencies that are included in SIB4;

4> include measurement results for at most 3 neighbours per inter-RAT frequency in accordance with the following:

5> if earlyMeasIndication is included in VarLog-MeasConfig:

6> include measurement results for inter-RAT neighbouring frequencies that are included in measIdle-CarrierListEUTRA or SIB5;

5> else:

6> include measurement results for inter-RAT frequencies that are included in SIB5;

4> for each neighbour cell included, include the optional fields that are available;

2> when the memory reserved for the logged measurement information becomes full, stop timer T330 and perform the same actions as performed upon expiry of T330, as specified in 3GPP standard specification.

Figure 11:
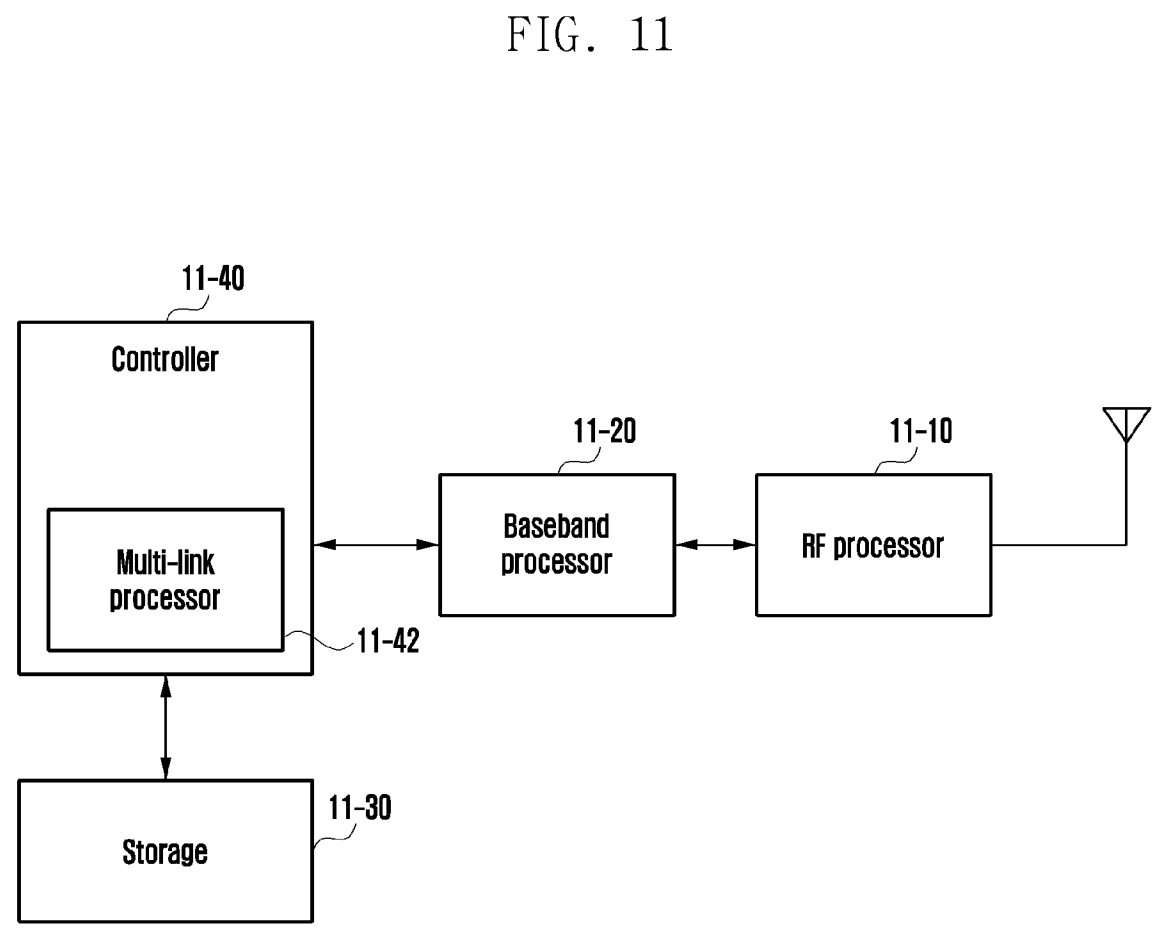

FIG. 11 illustrates an internal structure of a UE according to an embodiment of the present disclosure.

Referring to the diagram, the UE includes a radio frequency (RF) processor 11-10, a baseband processor 11-20, a storage 11-30, and a controller 11-40.

The RF processor 11-10 performs a function for transmitting and receiving a signal through a radio channel, such as band conversion and amplification of a signal. That is, the RF processor 11-10 up-converts a baseband signal provided from the baseband processor 11-20 into an RF band signal, transmits the RF band signal through an antenna, and down-converts the RF band signal received through the antenna to the baseband signal. For example, the RF processor 11-10 may include a transmission filter, a reception filter, an amplifier, a mixer, an oscillator, a digital to analog converter (DAC), an analog to digital converter (ADC), etc. In the diagram, only one antenna is illustrated, but the UE may include a plurality of antennas. In addition, the RF processor 11-10 may include a plurality of RF chains. Furthermore, the RF processor 11-10 may perform beamforming. For the beamforming, the RF processor 11-10 may adjust the phase and magnitude of each of signals transmitted and received through a plurality of antennas or antenna elements. In addition, the RF processor may perform MIMO, and may receive multiple layers when performing MIMO operation.

The baseband processor 11-20 performs a function of converting between a baseband signal and a bit stream according to a physical layer standard of the system. For example, when transmitting data, the baseband processor 11-20 generates complex symbols by encoding and modulating a transmitted bit stream. In addition, when receiving data, the baseband processor 11-20 restores a received bit stream by demodulating and decoding the baseband signal provided from the RF processor 11-10. For example, in the case of following an orthogonal frequency division multiplexing (OFDM) scheme, when transmitting data, the baseband processor 11-20 generates complex symbols by encoding and modulating a transmitted bit stream, maps the complex symbols to subcarriers, and then configures OFDM symbols through an inverse fast Fourier transform (IFFT) operation and cyclic prefix (CP) insertion. In addition, when receiving data, the baseband processor 11-20 divides the baseband signal provided from the RF processor 11-10 into OFDM symbol units, restores signals mapped to subcarriers through a fast Fourier transform (FFT) operation, and then restores a received bit stream through demodulation and decoding.

The baseband processor 11-20 and the RF processor 11-10 transmits and receives signals as described above. Accordingly, the baseband processor 11-20 and the RF processor 11-10 may be referred to as a transmitter, a receiver, a transceiver, or a communicator. Furthermore, at least one of the baseband processor 11-20 and the RF processor 11-10 may include a plurality of communication modules to support a plurality of different radio access technologies. In addition, at least one of the baseband processor 11-20 and the RF processor 11-10 may include different communication modules to process signals of different frequency bands. For example, the different radio access technologies may include a wireless LAN (e.g., IEEE 802.11), a cellular network (e.g., LTE), or the like. In addition, the different frequency bands may include a super high frequency (SHF) (e.g., 2.5 GHz, 5 GHz) band and a millimeter wave (e.g., 60 GHz) band.

The storage 11-30 stores data such as a basic program, an application program, and configuration information for the operation of the UE. In particular, the storage 11-30 may store information related to a second access node performing wireless communication by using the second radio access technology. In addition, the storage 11-30 provides stored data according to the request of the controller 11-40.

The controller 11-40 controls overall operations of the UE. For example, the controller 11-40 transmits and receives signals through the baseband processor 11-20 and the RF processor 11-10. In addition, the controller 11-40 writes data in the storage 11-30 and reads the data. To this end, the controller 11-40 may include at least one processor. For example, the controller 11-40 may include a communication processor (CP) that controls for communication and an application processor (AP) that controls an upper layer such as an application program. For example, the controller 11-40 is configured to initiate a connection establishment procedure or a connection resume procedure on a cell and start a timer corresponding to the connection establishment procedure or the connection resume procedure, identify that the timer expires, in case that a cell identity of the cell is not equal to a cell identity stored in a UE variable for a connection failure report, store first connection failure report information which was stored in the UE variable in a new entry of a list of UE variables for multiple connection failure reports, clear the UE variable and store second connection failure report information for the cell in the UE variable, and transmit, via the transceiver (including RF processor 11-10 and baseband processor 11-20), a message including the UE variable and the list of UE variables.

Figure 12:
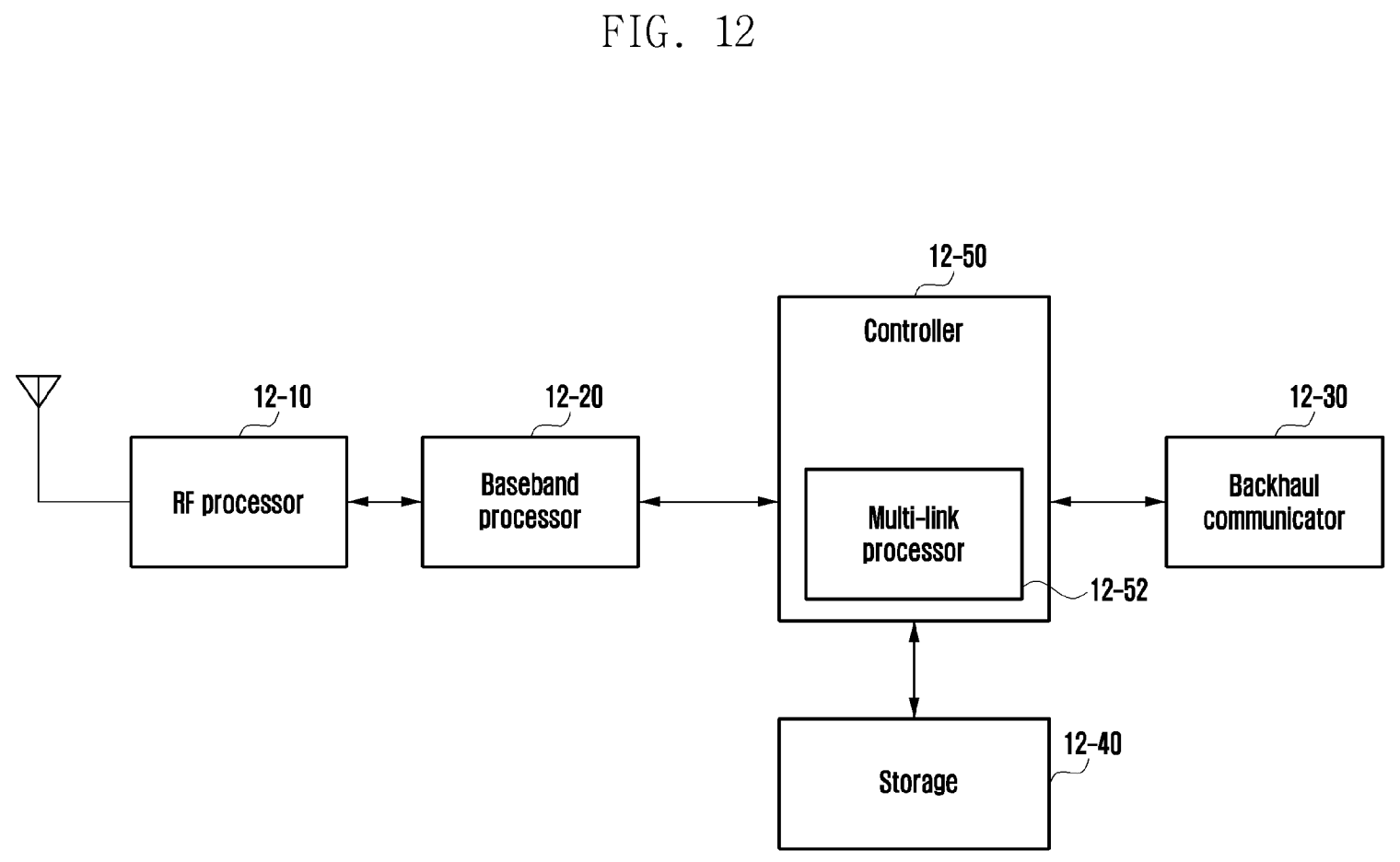

FIG. 12 illustrates a configuration of an NR base station according to an embodiment of the present disclosure.

As illustrated in the diagram, the base station is configured including an RF processor 12-10, a baseband processor 12-20, a backhaul communicator 12-30, a storage 12-40, and a controller 12-50.

The RF processor 12-10 performs a function for transmitting and receiving a signal through a radio channel, such as band conversion and amplification of the signal. That is, the RF processor 12-10 up-converts the baseband signal provided from the baseband processor 12-20 into an RF band signal, transmits the same through an antenna, and down-converts the RF band signal received through the antenna into a baseband signal. For example, the RF processor 12-10 may include a transmission filter, a reception filter, an amplifier, a mixer, an oscillator, a DAC, an ADC, and the like. Although only one antenna is illustrated in the diagram, the first access node may include a plurality of antennas. In addition, the RF processor 12-10 may include a plurality of RF chains. Furthermore, the RF processor 12-10 may perform beamforming. For the beamforming, the RF processor 12-10 may adjust the phase and magnitude of each of signals transmitted and received through a plurality of antennas or antenna elements. The RF processor may perform a downlink MIMO operation by transmitting one or more layers.

The baseband processor 12-20 performs a function of converting between a baseband signal and a bit stream according to the physical layer standard of the first radio access technology. For example, when transmitting data, the baseband processor 12-20 generates complex symbols by encoding and modulating a transmitted bit stream. In addition, when receiving data, the baseband processor 12-20 restores a received bit stream through demodulating and decoding the baseband signal provided from the RF processor 12-10. For example, in the case of following the OFDM scheme, when transmitting data, the baseband processor 12-20 generates complex symbols by encoding and modulating a transmitted bit stream, maps the complex symbols to subcarriers, and then configures OFDM symbols through IFFT operation and CP insertion. In addition, when receiving data, the baseband processor 12-20 divides the baseband signal provided from the RF processor 12-10 into OFDM symbol units, restores signals mapped to subcarriers through FFT operation, and then restores a received bit stream through demodulation and decoding. The baseband processor 12-20 and the RF processor 12-10 transmits and receives signals as described above. Accordingly, the baseband processor 12-20 and the RF processor unit 12-10 may be referred to as a transmitter, a receiver, a transceiver, a communicator, or a wireless communicator.

The backhaul communicator 12-30 provides an interface for performing communication with other nodes in the network. That is, the backhaul communicator 12-30 converts a bit stream transmitted from the main base station to another node, for example, an auxiliary base station, a core network, or the like, into a physical signal, and converts a physical signal received from the other node into a bit stream.

The storage 12-40 stores data such as a basic program, an application program, and configuration information for the operation of the main base station. In particular, the storage 12-40 may store information on a bearer allocated to an accessed UE, a measurement result reported from the accessed UE, and the like. In addition, the storage 12-40 may store information serving as a criterion for determining whether to provide or stop multiple connections to the UE. In addition, the storage 12-40 provides stored data according to the request of the controller 12-50.

The controller 12-50 controls overall operations of the main base station. For example, the controller 12-50 transmits and receives signals through the baseband processor 12-20 and the RF processor 12-10 or through the backhaul communicator 12-30. In addition, the controller 12-50 writes data in the storage 12-40 and reads the data. To this end, the controller 12-50 may include at least one processor. For example, the controller 12-50 is configured to perform with a UE a connection establishment procedure or a connection resume procedure on a cell and receive, via the transceiver (including RF processor 12-10 and baseband processor 12-20), a message including a UE variable for a connection failure report and a list of UE variables for multiple connection failure reports.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:
   upon initiation of a connection related procedure on a cell, starting a timer for the connection related procedure;
   based on the timer expiring;
      in case that a cell identity of the cell is not equal to a cell identity stored in a first UE variable including connection failure information, storing the first UE variable as a new entry in a second UE variable including a list of connection failure information;
      clearing the first UE variable; and
      storing connection failure information for the cell in the first UE variable;
   receiving, from a base station, a UE information request message including information indicating that the UE is to report information about connection failure; and
   transmitting, to the base station, a UE information response message including a first field and a second field, as a response to the UE information request message, wherein the first field is set to a value in the first UE variable and the second field is set to a value in the second UE variable.

2. The method of claim 1, wherein the storing of the first UE variable as the new entry in the second UE variable comprises:
   in case that a registered public land mobile network (PLMN) corresponds to a PLMN identity stored in the first UE variable and the cell identity of the cell is not equal to the cell identity stored in the first UE variable, storing the first UE variable as the new entry in the second UE variable.

3. The method of claim 1, further comprising:
   in case that a registered public land mobile network (PLMN) does not correspond to a PLMN identity stored in the second UE variable, clearing the second UE variable.

4. The method of claim 1, further comprising:
   transmitting, to the base station, UE capability information indicating whether the UE supports multiple connection failure reports.

5. The method of claim 1, wherein each connection failure information in the second UE variable includes information indicating a time that elapsed since a connection failure.

6. The method of claim 1, wherein the second UE variable comprises a predetermined number of entries.

7. The method of claim 1, wherein the first UE variable further includes information indicating a number of consecutive failed connection related procedures in a same cell, and wherein the clearing of the first UE variable comprises clearing content of the first UE variable except for the information indicating the number of consecutive failed connection related procedures in the same cell.

8. The method of claim 1, further comprising:
   discarding connection failure information from the first UE variable and the second UE variable upon successful delivery of the UE information response message.

9. The method of claim 1, wherein the connection related procedure corresponds to a connection establishment procedure, and wherein the timer corresponds to a timer T310 for the connection establishment procedure.

10. The method of claim 1, wherein the connection related procedure corresponds to a connection resume procedure, and wherein the timer corresponds to a timer T319 for the connection resume procedure.

11. A user equipment (UE) in a wireless communication system, the UE comprising:
   a transceiver; and
   a controller operably coupled to the transceiver, the controller configured to:
      upon initiation of a connection related procedure on a cell, start a timer for the connection related procedure,
      based on the timer expiring:
         in case that a cell identity of the cell is not equal to a cell identity stored in a first UE variable including connection failure information, store the first UE variable as a new entry in a second UE variable including a list of connection failure information,
         clear the first UE variable, and
         store connection failure information for the cell in the first UE variable,
      receive, from a base station via the transceiver, a UE information request message including information indicating that the UE is to report information about connection failure, and
      transmit, to the base station via the transceiver, a UE information response message including a first field and a second field, as a response to the UE information request message, wherein the first field is set to a value in the first UE variable and the second field is set to a value in the second UE variable.

12. The UE of claim 11, wherein, for storing the first UE variable as the new entry in the second UE variable, the controller is configured to:

in case that a registered public land mobile network (PLMN) corresponds to a PLMN identity stored in the first UE variable and the cell identity of the cell is not equal to the cell identity stored in the first UE variable, store the first UE variable as the new entry in the second UE variable.

13. The UE of claim 11, wherein the controller is further configured to:

in case that a registered public land mobile network (PLMN) does not correspond to a PLMN identity stored in the second UE variable, clear the second UE variable.

14. The UE of claim 11, wherein the controller is further configured to:

transmit, to the base station via the transceiver, UE capability information indicating whether the UE supports multiple connection failure reports.

15. The UE of claim 11, wherein each connection failure information in the second UE variable includes information indicating a time that elapsed since a connection failure.

16. The UE of claim 11, wherein the second UE variable comprises a predetermined number of entries.

17. The UE of claim 11, wherein the first UE variable further includes information indicating a number of consecutive failed connection related procedures in a same cell, and wherein, for clearing the first UE variable, the controller is configured to clear content of the first UE variable except for the information indicating the number of consecutive failed connection related procedures in the same cell.

18. The UE of claim 11, wherein the controller is further configured to:

discard connection failure information from the first UE variable and the second UE variable upon successful delivery of the UE information response message.

19. The UE of claim 11, wherein the connection related procedure corresponds to a connection establishment procedure, and wherein the timer corresponds to a timer T310 for the connection establishment procedure.

20. The UE of claim 11, wherein the connection related procedure corresponds to a connection resume procedure, and wherein the timer corresponds to a timer T319 for the connection resume procedure.

* * * * *